(12) United States Patent
Ryu et al.

(10) Patent No.: US 11,722,944 B2
(45) Date of Patent: Aug. 8, 2023

(54) HANDOVER SCHEMES FOR MILLIMETER WAVE (MMW) WIRELESS COMMUNICATIONS

(71) Applicant: QUALCOMM INCORPORATED, San Diego, CA (US)

(72) Inventors: Jung Ho Ryu, Fort Lee, NJ (US); Navid Abedini, Basking Ridge, NJ (US); Junyi Li, Fairless Hills, PA (US); Karl Georg Hampel, Hoboken, NJ (US); Muhammad Nazmul Islam, Littleton, MA (US); Sundar Subramanian, San Diego, CA (US); Jianghong Luo, Skillman, NJ (US); Juergen Cezanne, Ocean Township, NJ (US); Vasanthan Raghavan, West Windsor Township, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/453,762

(22) Filed: Nov. 5, 2021

(65) Prior Publication Data

US 2022/0060960 A1 Feb. 24, 2022

Related U.S. Application Data

(62) Division of application No. 16/189,457, filed on Nov. 13, 2018, now Pat. No. 11,191,001.

(Continued)

(51) Int. Cl.
*H04W 36/00* (2009.01)
*H04W 72/04* (2023.01)
(Continued)

(52) U.S. Cl.
CPC .......... *H04W 36/32* (2013.01); *H04L 5/0048* (2013.01); *H04W 36/0055* (2013.01);
(Continued)

(58) Field of Classification Search
None
See application file for complete search history.

(56) References Cited

U.S. PATENT DOCUMENTS

| 10,374,839 B2 * | 8/2019 | Park ........................ H04L 1/00 |
| 2013/0223329 A1 | 8/2013 | Jain et al. |

(Continued)

FOREIGN PATENT DOCUMENTS

| CN | 101568163 A | 10/2009 |
| CN | 101754293 A | 6/2010 |

(Continued)

OTHER PUBLICATIONS

International Search Report and Written Opinion—PCT/US2018/060941—ISA/EPO—Apr. 24, 2019.

(Continued)

*Primary Examiner* — Sai Aung
(74) *Attorney, Agent, or Firm* — Holland & Hart LLP

(57) ABSTRACT

Methods, systems, and devices for wireless communications are described. A user equipment (UE) may initiate handover from one base station to another. The handover procedure may not include random access channel (RACH) transmissions, and thus may be a localized RACH-less handover. The UE may initiate handover to a new base station based on the relative location of the UE and the new base station, some predetermined time, or based on the characteristics of the signals from each base station.

28 Claims, 15 Drawing Sheets

Related U.S. Application Data

(60) Provisional application No. 62/589,340, filed on Nov. 21, 2017.

(51) Int. Cl.

| | | |
|---|---|---|
| *H04W 16/28* | (2009.01) | |
| *H04W 36/32* | (2009.01) | |
| *H04L 5/00* | (2006.01) | |
| *H04W 36/36* | (2009.01) | |
| *H04W 74/08* | (2009.01) | |
| *H04W 36/24* | (2009.01) | |
| *H04W 88/04* | (2009.01) | |

(52) U.S. Cl.
CPC ....... *H04W 36/36* (2013.01); *H04W 74/0833* (2013.01); *H04W 36/0005* (2013.01); *H04W 36/0058* (2018.08); *H04W 36/245* (2013.01); *H04W 88/04* (2013.01)

(56) References Cited

U.S. PATENT DOCUMENTS

| | | | |
|---|---|---|---|
| 2013/0242941 A1 | 9/2013 | Ebesu | |
| 2013/0301619 A1 | 11/2013 | Singh et al. | |
| 2015/0230263 A1 | 8/2015 | Roy et al. | |
| 2015/0295694 A1* | 10/2015 | Li | H04B 7/0452 |
| | | | 370/329 |
| 2016/0157219 A1* | 6/2016 | Uemura | H04L 5/0053 |
| | | | 370/329 |
| 2016/0157223 A1* | 6/2016 | Nogami | H04W 72/0446 |
| | | | 370/329 |
| 2016/0174124 A1 | 6/2016 | Basu Mallick et al. | |
| 2016/0219475 A1* | 7/2016 | Kim | H04W 76/19 |
| 2016/0262077 A1 | 9/2016 | Zhang et al. | |
| 2017/0181134 A1* | 6/2017 | Niu | H04W 48/00 |
| 2017/0208480 A1 | 7/2017 | Takahashi et al. | |
| 2018/0069606 A1 | 3/2018 | Jung et al. | |
| 2018/0115357 A1* | 4/2018 | Park | H04L 5/005 |
| 2019/0052331 A1* | 2/2019 | Chang | H04B 7/0626 |
| 2019/0159102 A1 | 5/2019 | Ryu et al. | |

FOREIGN PATENT DOCUMENTS

| | | |
|---|---|---|
| WO | WO2016003624 A1 | 1/2016 |
| WO | WO2017196491 A1 | 11/2017 |

OTHER PUBLICATIONS

International Preliminary Report on Patentability—PCT/US2018/060941 The International Bureau of WIPO—Geneva, Switzerland, Jun. 4, 2020.

Qualcomm Incorporated: "Comparison of Mobility Improvements for LTE", R2-162910, 3GPP TSG-RAN2 Meeting #93bis, Dubrovnik, Croatia, Apr. 12-16, 2016, 3 Pages.

Sung N.W., et al., "Fast Intra-Beam Switching Scheme Using Common Contention Channels in Millimeter-Wave Based Cellular Systems", 18th International Conference on Advanced Communications Technology (ICACT), Global IT Research Institute (GIRI), vol. 5, No. 1, Jan. 2016, pp. 760-765, XP032875584, DOI: 10.1109/ICACT.2016.7423617 [retrieved on Mar. 1, 2016] the whole document, Mar. 3, 2016.

* cited by examiner

HANDOVER SCHEMES FOR MILLIMETER WAVE (MMW) WIRELESS COMMUNICATIONS

CROSS REFERENCES

The present application for patent is a Divisional of U.S. patent application Ser. No. 16/189,457 by Ryu et al., entitled "HANDOVER SCHEMES FOR MILLIMETER WAVE (MMW) WIRELESS COMMUNICATIONS" filed Nov. 13, 2018, which claims the benefit of U.S. Provisional Patent Application No. 62/589,340 by RYU et al., entitled "HANDOVER SCHEMES FOR MILLIMETER WAVE (MMW) WIRELESS COMMUNICATIONS," filed Nov. 21, 2017, assigned to the assignee hereof, and expressly incorporated by reference herein.

BACKGROUND

The following relates generally to wireless communications, and more specifically to handover schemes for millimeter wave (mmW) wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

A UE in a wireless communications system may be transitioned or handed over from one base station to another. However, there may be substantial overhead associated with handover procedures. The handover procedures may be facilitated by a mobility management entity (MME), which may increase the latency of a handover procedure. Additionally, the UE may rely on transmitting and receiving signals via a random access channel (RACH) to determine the connectivity parameters for the impending handover. RACH messages may introduce another source of high overhead for a handover procedure.

SUMMARY

A user equipment (UE) may be transitioned or handed over from one base station to another. The handover procedure may be initiated by the UE and the handover may not involve random access channel (RACH) transmissions in a localized RACH-less handover. The UE may determine to initiate the handover to a new base station based on the relative location of the UE and the new base station, some predetermined time, or based on the characteristics of the signals from each base station. After deciding to initiate the handover procedure to the next base station, the UE may transmit a handover message and configuration to the current base station. The handover message and configuration information may include any connectivity parameters associated with a handover procedure. In some cases, the UE may detect a high signal strength beam from the new base station, and the UE may identify the beam to the current base station in the configuration information. The current base station may send (e.g., forward) the handover message and configuration information to the next base station. In some other examples, the UE may transmit the handover message and configuration information directly to the next base station. This communication between the next base station and the UE may eliminate the use of RACH in the handover procedure.

A method of wireless communications is described. The method may include establishing, by a UE, a first connection with a first base station, determining, by the UE, to perform handover from the first base station to a second base station, transmitting, based at least in part on the determination to perform handover, a handover message including a handover configuration associated with the second base station, and establishing, by the UE, a second connection with the second base station according to a connection configuration.

An apparatus for wireless communications is described. The apparatus may include means for establishing, by a UE, a first connection with a first base station, means for determining, by the UE, to perform handover from the first base station to a second base station, means for transmitting, based at least in part on the determination to perform handover, a handover message including a handover configuration associated with the second base station, and means for establishing, by the UE, a second connection with the second base station according to a connection configuration.

Another apparatus for wireless communications is described. The apparatus may include a processor, memory in electronic communication with the processor, and instructions stored in the memory. The instructions may be operable to cause the processor to establish, by a UE, a first connection with a first base station, determine, by the UE, to perform handover from the first base station to a second base station, transmit, based at least in part on the determination to perform handover, a handover message including a handover configuration associated with the second base station, and establish, by the UE, a second connection with the second base station according to a connection configuration.

A non-transitory computer-readable medium for wireless communications is described. The non-transitory computer-readable medium may include instructions operable to cause a processor to establish, by a UE, a first connection with a first base station, determine, by the UE, to perform handover from the first base station to a second base station, transmit, based at least in part on the determination to perform handover, a handover message including a handover configuration associated with the second base station, and establish, by the UE, a second connection with the second base station according to a connection configuration.

In some examples of the method, apparatus, and non-transitory computer-readable medium described herein, determining to perform handover includes triggering a handover procedure based at least in part on a location of the UE with respect to the first base station or the second base station, a speed of the UE relative to the first base station or the second base station, a time of connection of the UE with the first base station, a time duration between handover procedures, or any combination thereof.

In some examples of the method, apparatus, and non-transitory computer-readable medium described herein, determining to perform handover includes triggering a handover procedure based at least in part on a round trip time (RTT) of a communication with the first base station or the second base station, a reference signal received power (RSRP) of a signal of the second base station, a beam angle of arrival (AoA) of the first base station or the second base station, a beam angle of departure (AoD) of the first base station or the second base station, or any combination thereof.

Some examples of the method, apparatus, and non-transitory computer-readable medium described herein may further include processes, features, means, or instructions for transmitting a handover timing to the first base station or the second base station, where the handover timing indicates a time delay in establishing the second connection. Some examples of the method, apparatus, and non-transitory computer-readable medium described herein may further include processes, features, means, or instructions for releasing resources associated with the first connection based at least in part on the time delay.

In some examples of the method, apparatus, and non-transitory computer-readable medium described herein, the handover timing may be included in the handover message.

Some examples of the method, apparatus, and non-transitory computer-readable medium described herein may further include processes, features, means, or instructions for receiving a resource allocation for establishing the second connection. Some examples of the method, apparatus, and non-transitory computer-readable medium described herein may further include processes, features, means, or instructions for communicating with the second base station according to the resource allocation.

Some examples of the method, apparatus, and non-transitory computer-readable medium described herein may further include processes, features, means, or instructions for determining a beam index for establishing the second connection. Some examples of the method, apparatus, and non-transitory computer-readable medium described herein may further include processes, features, means, or instructions for communicating with the second base station according to the beam index.

In some examples of the method, apparatus, and non-transitory computer-readable medium described herein, the resource allocation may be included in the connection configuration.

In some examples of the method, apparatus, and non-transitory computer-readable medium described herein, the beam index may be included in the connection configuration.

In some examples of the method, apparatus, and non-transitory computer-readable medium described herein, the second connection may be established without using a random access procedure.

Some examples of the method, apparatus, and non-transitory computer-readable medium described herein may further include processes, features, means, or instructions for receiving, at the UE, a reference signal from the second base station. Some examples of the method, apparatus, and non-transitory computer-readable medium described herein may further include processes, features, means, or instructions for performing a measurement of the reference signal received from the second base station. Some examples of the method, apparatus, and non-transitory computer-readable medium described herein may further include processes, features, means, or instructions for transmitting, based at least in part on the measurement of the reference signal, a measurement report to the first base station or the second base station.

Some examples of the method, apparatus, and non-transitory computer-readable medium described herein may further include processes, features, means, or instructions for determining a beam configuration for the second base station based at least in part on the reference signal, where the measurement report includes the beam configuration.

In some examples of the method, apparatus, and non-transitory computer-readable medium described herein, receiving the connection configuration includes receiving control information from the second base station based at least in part on the beam configuration.

Some examples of the method, apparatus, and non-transitory computer-readable medium described herein may further include processes, features, means, or instructions for predicting a beam pair link between the UE and the second base station based at least in part on the beam configuration. Some examples of the method, apparatus, and non-transitory computer-readable medium described herein may further include processes, features, means, or instructions for communicating with the second base station based at least in part on the predicted beam pair link.

In some examples of the method, apparatus, and non-transitory computer-readable medium described herein, the beam configuration may be determined based at least in part on a determination that a signal strength of a beam associated with the reference signal satisfies a threshold.

In some examples of the method, apparatus, and non-transitory computer-readable medium described herein, the beam configuration includes a synchronization signal (SS) block index or a channel state information reference signal (CSI-RS) resource indicator (CRI).

Some examples of the method, apparatus, and non-transitory computer-readable medium described herein may further include processes, features, means, or instructions for identifying a measurement configuration that includes a measurement window, where the measurement may be performed based at least in part on the measurement configuration.

In some examples of the method, apparatus, and non-transitory computer-readable medium described herein, identifying the measurement configuration includes receiving an indication of the measurement configuration from the first base station.

In some examples of the method, apparatus, and non-transitory computer-readable medium described herein, the measurement report may be included in the handover message.

Some examples of the method, apparatus, and non-transitory computer-readable medium described herein may further include processes, features, means, or instructions for receiving the connection configuration from the first base station or second base station.

In some examples of the method, apparatus, and non-transitory computer-readable medium described herein, the reference signal includes a CSI-RS or a SS.

In some examples of the method, apparatus, and non-transitory computer-readable medium described herein, the UE may be associated with a high speed train.

In some examples of the method, apparatus, and non-transitory computer-readable medium described herein, the UE may be a relay UE for a set of UEs.

A method of wireless communications is described. The method may include establishing, at a first base station, a first connection with a UE, receiving, from the UE, a handover message that includes a handover configuration for a second base station, transmitting, based at least in part on the handover message, an indication of the handover configuration to the second base station, and performing handover of the UE from the first base station to the second base station based at least in part on the handover configuration.

An apparatus for wireless communications is described. The apparatus may include means for establishing, at a first base station, a first connection with a UE, means for receiving, from the UE, a handover message that includes a handover configuration for a second base station, means for transmitting, based at least in part on the handover message, an indication of the handover configuration to the second base station, and means for performing handover of the UE from the first base station to the second base station based at least in part on the handover configuration.

Another apparatus for wireless communications is described. The apparatus may include a processor, memory in electronic communication with the processor, and instructions stored in the memory. The instructions may be operable to cause the processor to establish, at a first base station, a first connection with a UE, receive, from the UE, a handover message that includes a handover configuration for a second base station, transmit, based at least in part on the handover message, an indication of the handover configuration to the second base station, and perform handover of the UE from the first base station to the second base station based at least in part on the handover configuration.

A non-transitory computer-readable medium for wireless communications is described. The non-transitory computer-readable medium may include instructions operable to cause a processor to establish, at a first base station, a first connection with a UE, receive, from the UE, a handover message that includes a handover configuration for a second base station, transmit, based at least in part on the handover message, an indication of the handover configuration to the second base station, and perform handover of the UE from the first base station to the second base station based at least in part on the handover configuration.

Some examples of the method, apparatus, and non-transitory computer-readable medium described herein may further include processes, features, means, or instructions for receiving, from the second base station, a connection configuration for the UE. Some examples of the method, apparatus, and non-transitory computer-readable medium described herein may further include processes, features, means, or instructions for transmitting the connection configuration to the UE prior to performing handover.

Some examples of the method, apparatus, and non-transitory computer-readable medium described herein may further include processes, features, means, or instructions for receiving a handover timing from the UE, where the handover timing indicates a time delay for performing handover of the UE. Some examples of the method, apparatus, and non-transitory computer-readable medium described herein may further include processes, features, means, or instructions for releasing resources associated with the first connection based at least in part on the time delay.

In some examples of the method, apparatus, and non-transitory computer-readable medium described herein, the handover timing may be included in the handover message.

Some examples of the method, apparatus, and non-transitory computer-readable medium described herein may further include processes, features, means, or instructions for receiving, from the second base station, a resource allocation for the UE. Some examples of the method, apparatus, and non-transitory computer-readable medium described herein may further include processes, features, means, or instructions for transmitting, to the UE, an indication of the resource allocation.

Some examples of the method, apparatus, and non-transitory computer-readable medium described herein may further include processes, features, means, or instructions for receiving, from the mmW UE, a beam index for the second base station. Some examples of the method, apparatus, and non-transitory computer-readable medium described herein may further include processes, features, means, or instructions for transmitting, to the second base station, an indication of the beam index.

In some examples of the method, apparatus, and non-transitory computer-readable medium described herein, the handover may be performed without using a random access procedure.

In some examples of the method, apparatus, and non-transitory computer-readable medium described herein, the UE may be associated with a high speed train.

In some examples of the method, apparatus, and non-transitory computer-readable medium described herein, the UE may be a relay UE for a set of UEs.

A method of wireless communications is described. The method may include receiving, from a first base station, a handover configuration for a UE, determining a connection configuration for the UE based at least in part on the handover configuration, transmitting, to the first base station, the connection configuration for the UE, and performing handover of the UE from the first base station to the second base station based at least in part on the connection configuration.

An apparatus for wireless communications is described. The apparatus may include means for receiving, from a first base station, a handover configuration for a UE, means for determining a connection configuration for the UE based at least in part on the handover configuration, means for transmitting, to the first base station, the connection configuration for the UE, and means for performing handover of the UE from the first base station to the second base station based at least in part on the connection configuration.

Another apparatus for wireless communications is described. The apparatus may include a processor, memory in electronic communication with the processor, and instructions stored in the memory. The instructions may be operable to cause the processor to receive, from a first base station, a handover configuration for a UE, determine a connection configuration for the UE based at least in part on the handover configuration, transmit, to the first base station, the connection configuration for the UE, and perform handover of the UE from the first base station to the second base station based at least in part on the connection configuration.

A non-transitory computer-readable medium for wireless communications is described. The non-transitory computer-readable medium may include instructions operable to cause a processor to receive, from a first base station, a handover configuration for a UE, determine a connection configuration for the UE based at least in part on the handover configuration, transmit, to the first base station, the connection configuration for the UE, and perform handover of the UE from the first base station to the second base station based at least in part on the connection configuration.

Some examples of the method, apparatus, and non-transitory computer-readable medium described herein may further include processes, features, means, or instructions for receiving an indication of a handover timing, where the handover timing indicates a time delay in performing handover.

In some examples of the method, apparatus, and non-transitory computer-readable medium described herein, the handover timing may be included in the handover configuration.

In some examples of the method, apparatus, and non-transitory computer-readable medium described herein, determining the connection configuration includes determining a resource allocation for establishing a connection with the UE.

Some examples of the method, apparatus, and non-transitory computer-readable medium described herein may further include processes, features, means, or instructions for determining a beam index for establishing a connection with the mmW UE.

Some examples of the method, apparatus, and non-transitory computer-readable medium described herein may further include processes, features, means, or instructions for communicating with the UE according to the resource allocation.

Some examples of the method, apparatus, and non-transitory computer-readable medium described herein may further include processes, features, means, or instructions for transmitting, to the UE, a reference signal, where handover may be performed based at least in part on the reference signal.

Some examples of the method, apparatus, and non-transitory computer-readable medium described herein may further include processes, features, means, or instructions for receiving, from the UE, a measurement report of the reference signal. Some examples of the method, apparatus, and non-transitory computer-readable medium described herein may further include processes, features, means, or instructions for determining a beam configuration for the UE based at least in part on the measurement report.

Some examples of the method, apparatus, and non-transitory computer-readable medium described herein may further include processes, features, means, or instructions for identifying a measurement configuration that includes a measurement window. Some examples of the method, apparatus, and non-transitory computer-readable medium described herein may further include processes, features, means, or instructions for transmitting the measurement configuration to the UE or the first base station, where the measurement report may be based at least in part on the measurement configuration.

In some examples of the method, apparatus, and non-transitory computer-readable medium described herein, the handover may be performed without using a random access procedure.

In some examples of the method, apparatus, and non-transitory computer-readable medium described herein, the UE may be associated with a high speed train.

In some examples of the method, apparatus, and non-transitory computer-readable medium described herein, the UE may be a relay UE for a set of UEs.

DETAILED DESCRIPTION

A user equipment (UE) in a millimeter wave (mmW) wireless communications system may be transitioned or handed over from one base station to another. In some mmW systems, there may be substantial overhead associated with handover procedures. For example, conventional handover procedures may rely on a mobility management entity (MME) to determine or facilitate a handover from a current base station to a target or new base station. Additionally, the UE may rely on transmitting and receiving signals via a random access channel (RACH) to determine the necessary connectivity parameters for the impending handover. The exchange of RACH signals may contribute to the overhead that exists for a conventional handover procedure.

Broadly, aspects of the disclosure provide for localized, RACH-less handovers, which may be used in certain environments, such as in an environment where the UEs may travel in known patterns. Examples may include train or subway environments, or highways or canals where UE movement is essentially limited to a linear direction of travel. In such circumstances, handovers may be initiated by the UE rather than by a base station or an MME. For example, the determination by a UE to initiate a handover may be based on a predetermined time or a relative distance between the UE and base stations along the linear path of the UE. Additionally, in such known or controlled environments, the connectivity parameters may be determined by the UE without a RACH transmission which may further decrease handover overhead. In another example, the UE may transmit a handover message to a current base station identifying a beam to be associated with its communication with the next base station. Additionally, the UE's current base station may transmit relevant information regarding communications with the next base station.

Aspects of the disclosure are initially described in the context of a wireless communications systems and process flows. Aspects of the disclosure are further illustrated by and described with reference to apparatus diagrams, system diagrams, and flowcharts that relate to handover schemes for mmW wireless communications.

Figure 1:
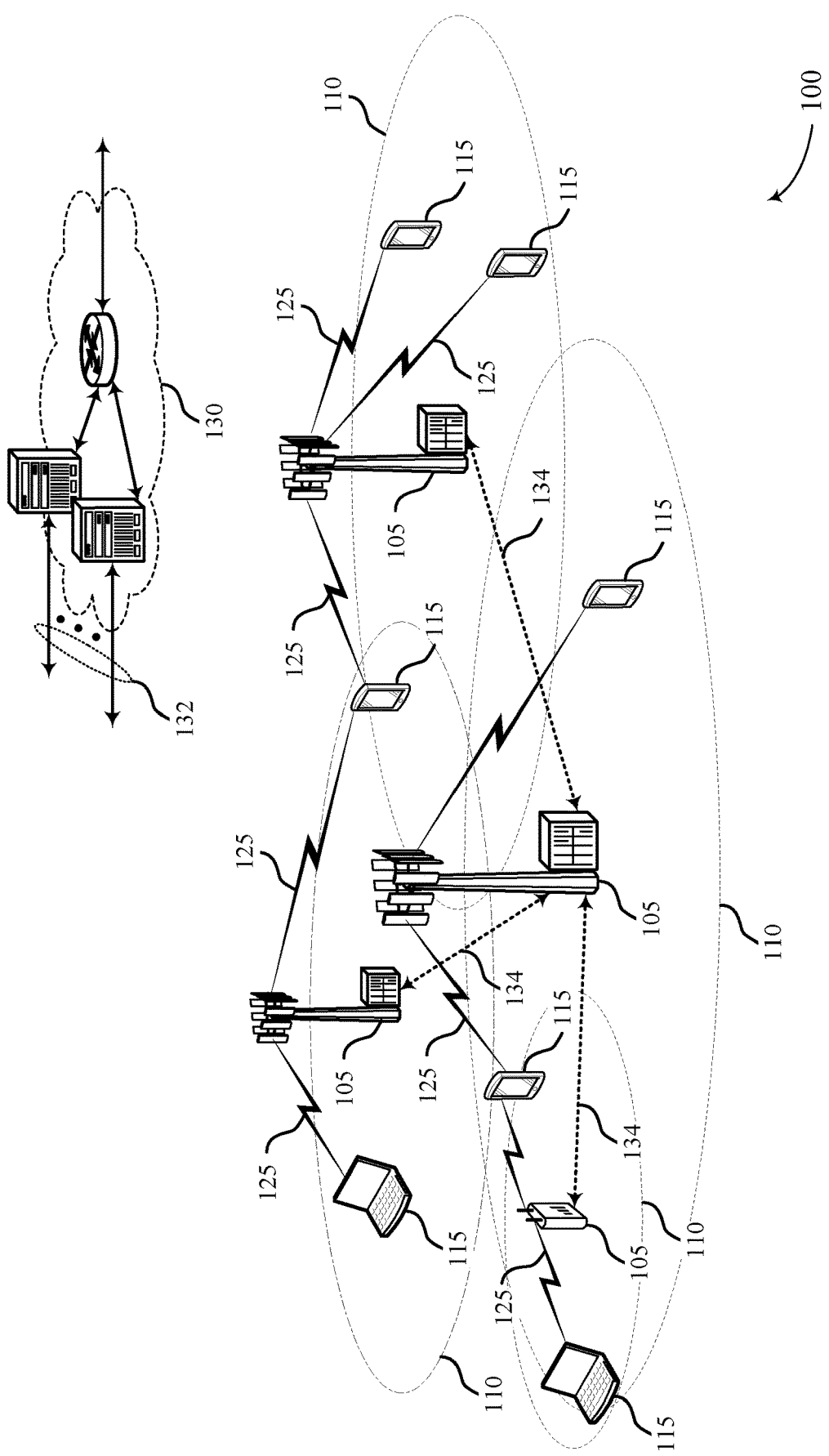
FIG. 1 illustrates an example of a wireless communications system in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an Si or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one MME, at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support mmW communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals (SSs), reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or transmitting a signal in a single direction (e.g., for transmitting data to a receiving device).

A receiving device (e.g., a UE 115, which may be an example of a mmW receiving device) may try multiple receive beams when receiving various signals from the base station 105, such as SSs, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARM) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers (CCs) using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology (RAT). Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-s-OFDM).

The organizational structure of the carriers may be different for different radio access technologies (e.g., LTE, LTE-A, NR). For example, communications over a carrier may be organized according to TTIs or slots, each of which may include user data as well as control information or signaling to support decoding the user data. A carrier may also include dedicated acquisition signaling (e.g., SSs or system information, etc.) and control signaling that coordinates operation for the carrier. In some examples (e.g., in a carrier aggregation (CA) configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular RAT (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks (RBs)) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as CA or multi-carrier operation. A UE 115 may be configured with multiple downlink CCs and one or more uplink CCs according to a CA configuration. CA may be used with both FDD and TDD component carriers.

In some cases, wireless communications system 100 may utilize enhanced CCs (eCCs). An eCC may be characterized by one or more features including wider carrier or frequency channel bandwidth, shorter symbol duration, shorter TTI duration, or modified control channel configuration. In some cases, an eCC may be associated with a CA configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some examples, a UE 115 may initiate a handover from one base station 105 to another. In the case that such a handover occurs due to movement, as the UE 115 moves farther from a first base station 105 and closer to a second base station 105, the UE 115 may detect a high signal-strength beam from the second base station 105 (e.g., based on measurements from a measurement window). In some examples, the UE 115 may compare a reference signal received power (RSRP) of a first base station 105 and an RSRP of a second base station 105. The UE 115 may then decide that handover from a first base station 105 to a second base station 105 based on the measurements is appropriate. After deciding to initiate the handover procedure to a second base station 105, the UE 115 may transmit a handover message and configuration to a first base station 105. The handover message and configuration information may include a beam of the second base station 105 detected by the UE 115 as having high signal strength and any connectivity parameters associated with the handover procedure. In some cases, the UE 115 may indicate to a first base station 105 a time that the handover will occur, or a remaining time during which the UE 115 will continue communicating with the first base station 105 (e.g., x ms). The first base station 105 may send (e.g., forward) the handover message and configuration information to a second base station 105. In some examples, the UE 115 may send the handover message and configuration information directly to a second base station 105.

Figure 2:
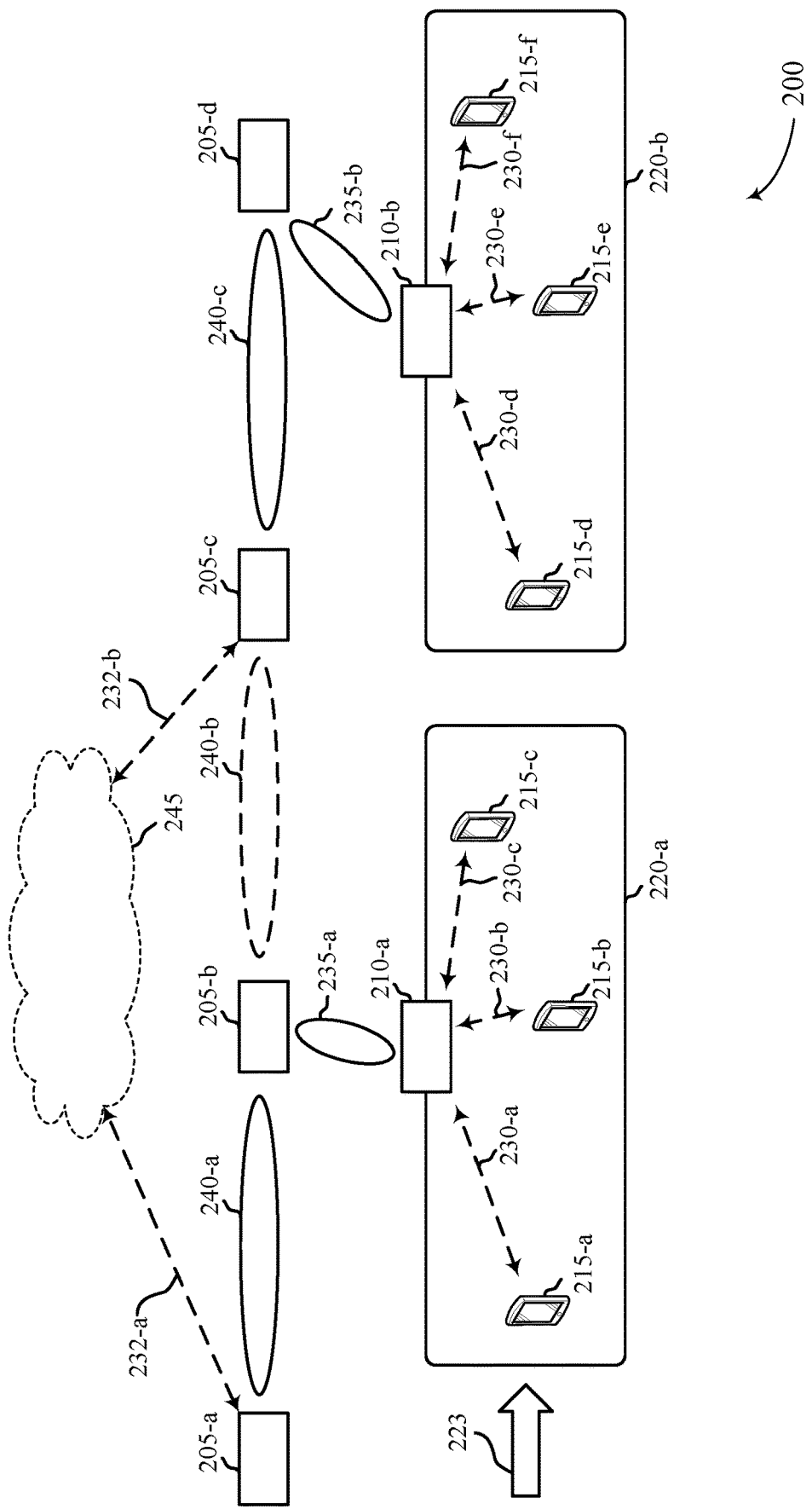
FIG. 2 illustrates an example of a wireless communications system in accordance with aspects of the present disclosure.

FIG. 2 illustrates an example of a wireless communications system 200 in accordance with various aspects of the present disclosure. In some examples, wireless communications system 200 may implement aspects of wireless communications system 100 as described with reference to FIG. 1.

Wireless communications system 200 may include a plurality of base stations 205, relay UEs 210, and UEs 215, which may be examples of the corresponding devices described herein.

In some aspects, the deployment scenario of wireless communications system 200 may include relay UEs 210 being mounted into vehicles 220. For example, relay UE 210-a may be mounted into vehicle 220-a and relay UE 210-b may be mounted into vehicle 220-b. Each of the vehicles 220 may include any mobile vehicle, such as an automobile, a bus, a train, a boat, a ship, a plane, and the like, that travels along a path. Accordingly, each base station 205 may be mounted in a fixed location and communicate with the relay UE 210 as the corresponding vehicle 220 traverses the coverage area of the respective base station 205. In one non-limiting example, the wireless communications system 200 may support deployment of a system where the vehicles 220 (and hence the mounted relay UEs 210) are traveling at a high rate of speed, such as a high-speed rail system. Accordingly, relay UEs 210 may be considered in a high-mobility state of operation when the vehicles 220 are in motion.

In some aspects, wireless communications system 200 illustrates one example deployment of a heterogeneous wireless communications system that utilizes more than one RAT. As one example, base stations 205 may be mmW gNBs that perform inter-base station communications using beamformed signals 240 and/or using wired communication links (not shown). In some aspects, some or all of the base stations 205 may be connected to a core network 245 via a backhaul link, e.g., an integrated access backhaul (IAB). In the example illustrated in FIG. 2, only base stations 205-a and 205-c have direct connections to the core network 245. In this example, base station 205-b may connect to the core network 245 via beamformed signal 240-a through base station 205-a and/or optionally via beamformed signal 240-b through base station 205-c. Similarly, base station 205-d may connect to the core network 245 via beamformed signal 240-c through base station 205-c. As can be appreciated, the number and spacing of base stations 205 and/or direct backhaul connections to the core network 245 may vary and may depend on the particular deployment scenario.

Another example of the heterogeneous deployment may include wireless links 230 between relay UEs 210 and UEs 215. In some aspects, the number and/or position of UEs 215 within a vehicle 220 may vary at any given time. For example, certain UEs 215 may depart a vehicle 220 at a first stop while other UEs 215 enter vehicle 220 at the first stop. The number and/or position of UEs 215 may change for any given stop that vehicle 220 makes. When UEs 215 enter a vehicle, the UEs 215 may establish a wireless link 230 with the relay UE 210. The wireless link 230 may be an example of any wireless RAT, such as cellular, Wi-Fi, Bluetooth, Near Field Communication (NFC), and the like. UEs 215 may then access the core network 245 via the respective relay UE 210. Each relay UE 210 may access the core network 245 using a beamformed signal 235 through an associated base station 205. For example, UE 215-a may communicate with relay UE 210-a via wireless link 230-a, relay UE 210-a may communicate with base station 205-b via beamformed signal 235-a, base station 205-b may communicate with base station 205-a via beamformed signal 240-a, and base station 205-a may provide the direct link to core network 245. As another example and for vehicle 220-b, UE 215-e may communicate with relay UE 210-b via wireless link 230-e, relay UE 210-b may communicate with base station 205-d via beamformed signal 235-b, base station 205-d may communicate with base station 205-c via beamformed signal 240-c, and base station 205-c may provide the direct link to core network 245. In some examples, relay UE 210 may be a mmW relay UE.

In some aspects, as the vehicles 220 travel along a path, the relay UEs 210 may change the base station 205 that they are associated with. For example, relay UE 210-a may initially be connected to base station 205-b and, as vehicle 220-a travels, relay UE 210-a may leave the coverage area of base station 205-b. In one example, each base station 205 may cover 100 m to 1000 m, and the contact time between base station 205-b and relay UE 210-a may range from one to seven seconds. As relay UE 210-a travels farther away from base station 205-b, relay UE 210-b may enter the coverage area of base station 205-c. Accordingly, relay UE 210-a may establish a new connection to base station 205-c. In some examples, relay UE 210-b may or may not remain connected to base station 205-b after connecting to base station 205-c. Maintaining the connection with base station 205-b may allow relay UE 210-a to have a high capacity connection to the core network 245 and better accommodate any aggregated traffic from the UEs 215.

To maintain a connection as vehicle 220-a moves, relay UE 210-a may be frequently transitioned from one base station 205 to the next. In some wireless systems, frequent handovers may result in significant handover overhead, as the frequency of handovers may compound the negative effects of handover overhead (e.g., reduced throughput, slow connection rates). However, in the deployment scenario of wireless communications system 200, handover overhead may be reduced by utilizing the known conditions of the wireless communications system 200 and by allowing relay UE 210-a to initiate the handovers. For example, relay UE 210-a may manage the handover and determine when a handover may occur between base stations 205. Therefore, handovers for relay UE 210-a may not be managed by a base station 205 or the core network 245.

In some examples, relay UE 210-a may determine connectivity parameters without utilizing RACH. In some wireless systems, a wireless device may perform a RACH to identify a new cell and establish communications with the new cell. For example, the wireless device and the new cell may exchange general connectivity parameters such as timing advance information, etc. However, relay UE 210-a may be aware of base stations 205 along the path of vehicle 220-a. Therefore, connectivity parameters may be determined without performing a RACH based on communication between base stations 205.

For example, relay UE 210-a may be transitioned from base station 205-a to base station 205-b. Prior to the handover procedure, relay UE 210-a may transmit a handover message and configuration to base station 205-a, and base station 205-a may forward the handover message and configuration to base station 205-b (e.g., by beamformed signal 240-a). Base station 205-b may allocate resources for relay UE 210-a, and transmit the resource allocation information to base station 205-a. Base station 205-a may forward the resource allocation information to relay UE 210-a. Therefore, relay UE 210-a may avoid performing a RACH to exchange connectivity parameters and receive a resource allocation from base station 205-b.

In general, performing a RACH-less handover may decrease overhead associated with handover procedures. For instance, in some cases, a relay UE 210 may rely on RACH to provide connectivity parameters utilized in handover (e.g., uplink timing advance). Since a number of wireless devices (e.g., other relay UEs 210 or UEs 215) may attempt to perform RACH with a base station 205 at a given time, it may take multiple attempts by a relay UE 210 to receive connectivity parameters through RACH. Using the methods described herein, a relay UE 210 may determine connectivity parameters without performing a RACH procedure, which may decrease the time required to obtain such connectivity parameters. Additionally or alternatively, the methods described herein may enable a relay UE 210 to determine when to perform a handover procedure (e.g., such that a base station 205 does not have to determine when to perform the handover procedure), which may increase efficiency associated with hand off.

Figure 3:
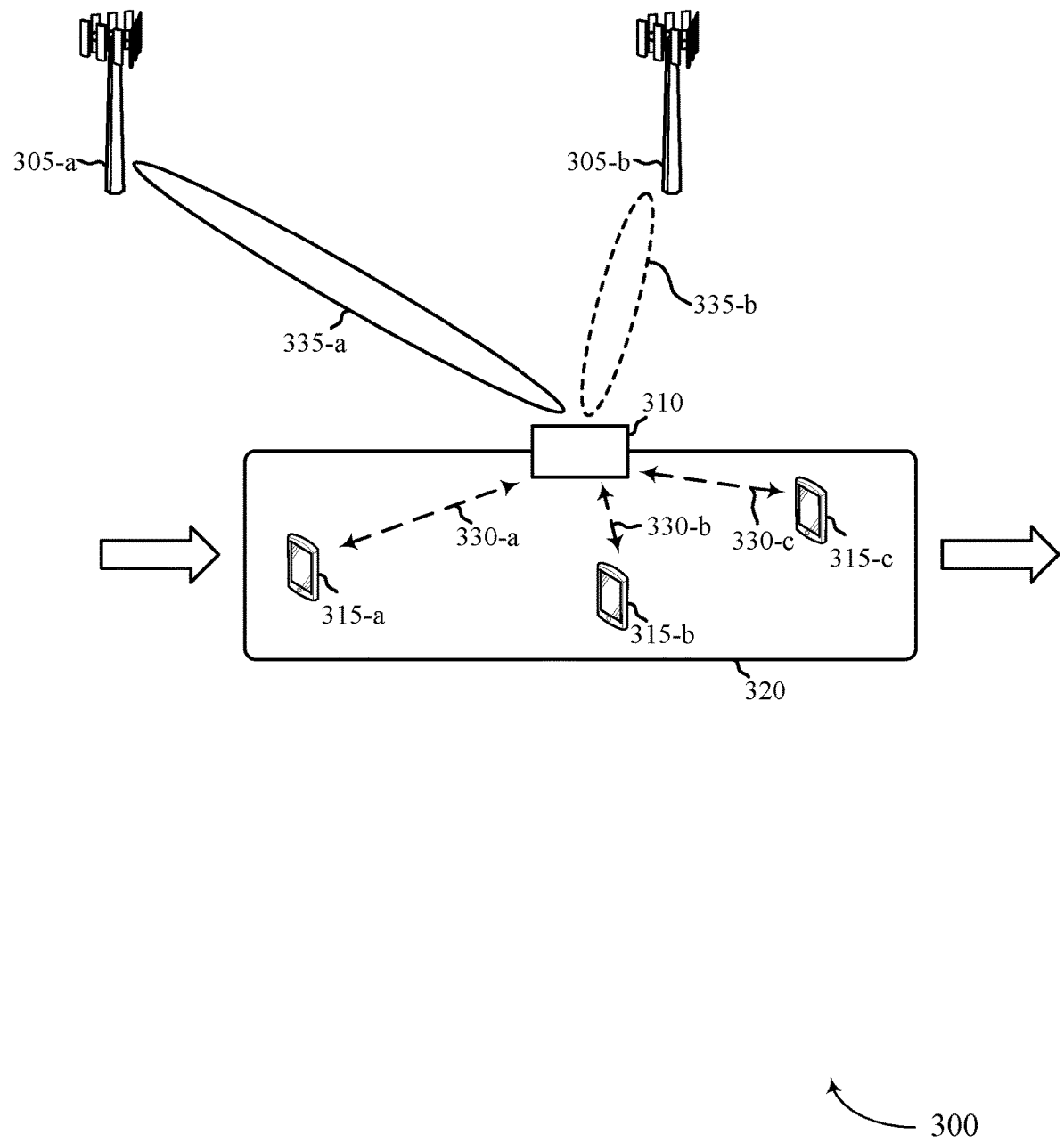
FIG. 3 illustrates an example of a wireless communications system in accordance with aspects of the present disclosure.

FIG. 3 illustrates an example of a wireless communications system 300 in accordance with various aspects of the present disclosure. In some examples, wireless communications system 300 may implement aspects of wireless communications systems 100 or 200 as described with reference to FIG. 1 or 2. Wireless communications system 300 may include a base station 305, a relay UE 310, and UEs 315, which may be examples of the corresponding devices described herein. As illustrated, relay UE 310 may undergo a RACH-less handover from base station 305-a to base station 305-b.

In some aspects, the vehicle 320 may be mobile and move along the indicated direction from base station 305-a to base station 305-b. Accordingly, the position of the relay UE 310 with respect to the base stations 305 may change over time. The relay UE 310 may currently be connected to base station 305-a and initiate a handover to base station 305-b. The relay UE 310 may detect base station 305-b and decide that handover from base station 305-a to base station 305-b is appropriate. In some examples, the relay UE 310 may receive an indication of a measurement window and measurement configurations from base station 305-a. The relay UE 310 may receive reference signals from base station 305-b during the measurement window based on the measurement configurations. For example, the relay UE 310 may receive a channel state information reference signal (CSI-RS) or a SS. In some cases, the measurements may be periodic, aperiodic, or semi-persistent. As the vehicle 320, and consequently the relay UE 310, moves farther from base station 305-a and closer to base station 305-b, the relay UE 310 may detect a high signal-strength beam from base station 305-b (e.g., based on the measurements). In some examples, the relay UE 310 may compare a RSRP of base station 305-a and an RSRP of base station 305-b. The relay UE 310 may then decide to initiate a handover from base station 305-a to base station 305-b based on the measurements.

In some examples, the UE 315 may receive the CSI-RS or the SS over one or more beams. Upon detecting a beam (e.g., a beam associated with an receive beam of the UE 315 to create an optimal transmit-receive (TX-RX) beam pair) of the one or more beams, the relay UE 310 may report information about the beam (e.g., a beam index) to base station 305-a. Base station 305-a may, in response, convey this beam information (e.g., the beam index) to base station 305-b, which may transmit data or control information to UE 315 based on this information (e.g., through the beam index). In some cases, the optimal TX-RX beam pair may change between the time when the UE 315 reports the beam information to base station 305-a and the time when base station 305-b begins transmitting data or control information to the UE 315. In such cases, the network (e.g., base station 105-a) may indicate to the UE 315 to receive the signal carrying the data or control information of base station 305-b with a pseudo-omni receive (RX) beam. Additionally or alternatively, the most optimal receive beam may be predicted based on the current RX beam (e.g., depending on a previous measurement, as the train may follow a predictable pattern) or through adaptive prediction algorithms.

In some examples, the network may pre-configure the UE 315 regarding the RACH configuration of some or all neighbor cells the UE 315 may encounter. During handover, a preamble index (e.g., preambleIndex) and a mask index (e.g., maskIndex) may be configured (e.g., by base station 305-a) at the UE 315. The mask index may define the set of specific time location and frequency resources within a RACH configuration period at which the UE 315 may transmit RACH. In RACH-less handover, the network may provide the UE 315 with a mask index to be used for multiple RACH configuration periods, which may enable a preamble index configured with the mask index to be used for a longer period of time than in RACH handover. Additionally, the preamble index may be reserved for neighboring cells (e.g., the neighboring cell the network is handing UE 315 off to) and may be a function of a UE ID associated with the UE 315. In the case that the preamble index is a function of the UE ID, the UE 315 may not receive information from the network regarding the suitable preamble index during handover.

In some examples, the handover decision may, additionally or alternatively, be based on a predetermined time. If the handover decision is based on a predetermined time, the relay UE 310 may receive controls and data from base station 305-b at a preconfigured time. In some cases, the handover time may be determined based on the speed and time of travel of the relay UE 310.

A Satellite Positioning System (SPS) may be used to determine positioning coordinates (e.g., for base stations 305, relay UEs 310, UEs 315, or other devices of wireless communications system 300), referred to herein as SPS coordinates. The SPS may use signals from regional and/or global satellite systems. Global systems include the Global Positioning System (GPS), Galileo, Global Navigation Satellite System (GLONASS), or the like. Regional satellite navigation systems include, for example, Quasi-Zenith Satellite System (QZSS) over Japan, Indian Regional Navigational Satellite System (IRNSS) over India, Beidou/Compass over China, etc., and/or various augmentation systems (e.g., a Satellite Based Augmentation System (SBAS)) that may be associated with or otherwise enabled for use with one or more global and/or regional navigation satellite systems. It should be noted that subject matter described herein is not limited to the use of space vehicles such as those space vehicles of the aforementioned global or regional satellite navigation systems.

In some examples, the relay UE 310 may initiate handover based on the relative distance between the relay UE 310 and the two base stations 305. For example, the relay UE 310 may decide to initiate the handover when base station 305-*b* is closer than base station 305-*a*. In some cases, the relay UE 310 may determine the relative distance based on its coordinates (e.g., SPS coordinates determined at least partially using an SPS) and the coordinates of the base stations 305. The relay UE 310 may calculate which base station 305 is closer based on the coordinates. In another example, the location of relay UE 310 may be based on a time of contact with base station 305-*a*.

In some examples, the relay UE 310 may determine relative distance based on round trip time (RTT) measurements. If the RTT for communication between the relay UE 310 and base station 305-*b* becomes shorter than the RTT for communication between the relay UE 310 and base station 305-*a*, the relay UE 310 may determine that base station 305-*b* is closer than base station 305-*a* and initiate the handover.

In some other examples, the relay UE 310 may determine the relative distance of the base stations 305 based on characteristics of the beamformed signals 335. Each beamformed signal 335 may have a particular beam angle, beam departure angle, beam transmit power, and the like. In some aspects, information indicative of the beam characteristics may be carried or otherwise conveyed in the associated beamformed signal 335.

In some examples, the relay UE 310 may use the angle of arrival (AoA) or angle of departure (AoD) of a beamformed signal 335 to determine which base station 305 is closer. As the angle of beamformed signal 335-*a* between the relay UE 310 and base station 305-*a* becomes more shallow, the relay UE 310 may determine that base station 305-*a* is farther away. Therefore, if the angle of beamformed signal 335-*b* is less shallow than beamformed signal 335-*a*, the relay UE 310 may determine base station 305-*b* is closer.

In another example, the relay UE 310 may use beamformed signal indices to determine which base station may be closer. As the relay UE 310 changes position with respect to a base station 305, the beam index used for communication changes. The relay UE 310 may therefore determine which base station 305 is closer based on which base station 305 is using more central beams for communication.

After deciding to initiate the handover procedure to base station 305-*b*, the relay UE 310 may transmit a handover message and configuration information to base station 305-*a*. The handover message and configuration information may include which beam was detected to have high signal strength and any connectivity parameters associated with a handover procedure. In some cases, the relay UE 310 may indicate to base station 305-*a* the time until handover (e.g., x ms). Base station 305-*a* may send (e.g., forward) the handover message and configuration information to base station 305-*b*. In some examples, the relay UE 310 may send the handover message and configuration information directly to base station 305-*b*. In some cases, the next base station 305-*b* may have time or frequency slots dedicated to accepting handover messages from any device. These time and frequency resources may accommodate the direct transmission from the relay UE 310. In this example, either the relay UE 310 or base station 305-*b* may transmit the handover information to base station 305-*a*.

Base station 305-*b* may send resource allocation information for the relay UE 310 to base station 305-*a*. Base station 305-*b* may allocate resources for the relay UE 310 to use after the handover occurs and relay UE 310 establishes a connection with base station 305-*b*. The resource allocation information may include time or frequency slot information for downlink or uplink transmissions, timing information regarding specific messages, or timing information regarding certain data transmissions, or any combination thereof. Base station 305-*a* may then forward the resource allocation information to the relay UE 310. In some instances, the resource allocation information may be transmitted directly from base station 305-*b* to the relay UE 310.

In some examples, the relay UE 310 may maintain the connection with base station 305-*a*. For example, the relay UE 310 may have indicated that handover occurs within x ms, and the relay UE 310 may decide to release all resources associated with base station 305-*a* after x ms. Then, the relay UE 310 may establish a connection with base station 305-*b*. Upon connecting to base station 305-*b*, the relay UE 310 may either decide to continue to maintain its connection with the current base station 305-*a* or decide to release all the resources it had been allocated by base station 305-*a*. If the relay UE 310 releases its resources for base station 305-*a*, then base station 305-*a* may forward downlink packets for the relay UE 310 to base station 305-*b*.

If the relay UE 310 decides to maintain connection with both base station 305-*a* and base station 305-*b*, the two base stations 305 may jointly schedule resources and configuration information for the relay UE 310. The core network, another base station, or the relay UE 310 may also help schedule the two base stations 305 and the relay UE 310. The relay UE 310 may decide to maintain connection with base station 305-*a* to accommodate high levels of traffic from the UEs 315.

In another embodiment, the relay UE 310 may use a predictive handover. A predictive handover may be similar to handover techniques described herein, but the relay UE 310 and the base stations 305 may be preconfigured with a time to perform the handover. In a predictive handover, the relay UE 310 and the base stations 305 may assume the handover will be successful (e.g., based on a path of the relay UE 310 going from base station 305 to base station 305).

In a predictive handover, the serving cell of relay UE 310 may begin semi-persistent scheduling for communication between the relay UE 310 and base station 305-*b* prior to performing a handover. Additionally, or alternatively, the relay UE 310 may send minimal handover information, such as only including a detected, strong beam of base station 305-*b*, which base station 305-*b* may use after the handover. In some examples, the relay UE 310 may be aware of resources allocation information prior to the handover.

Figure 4:
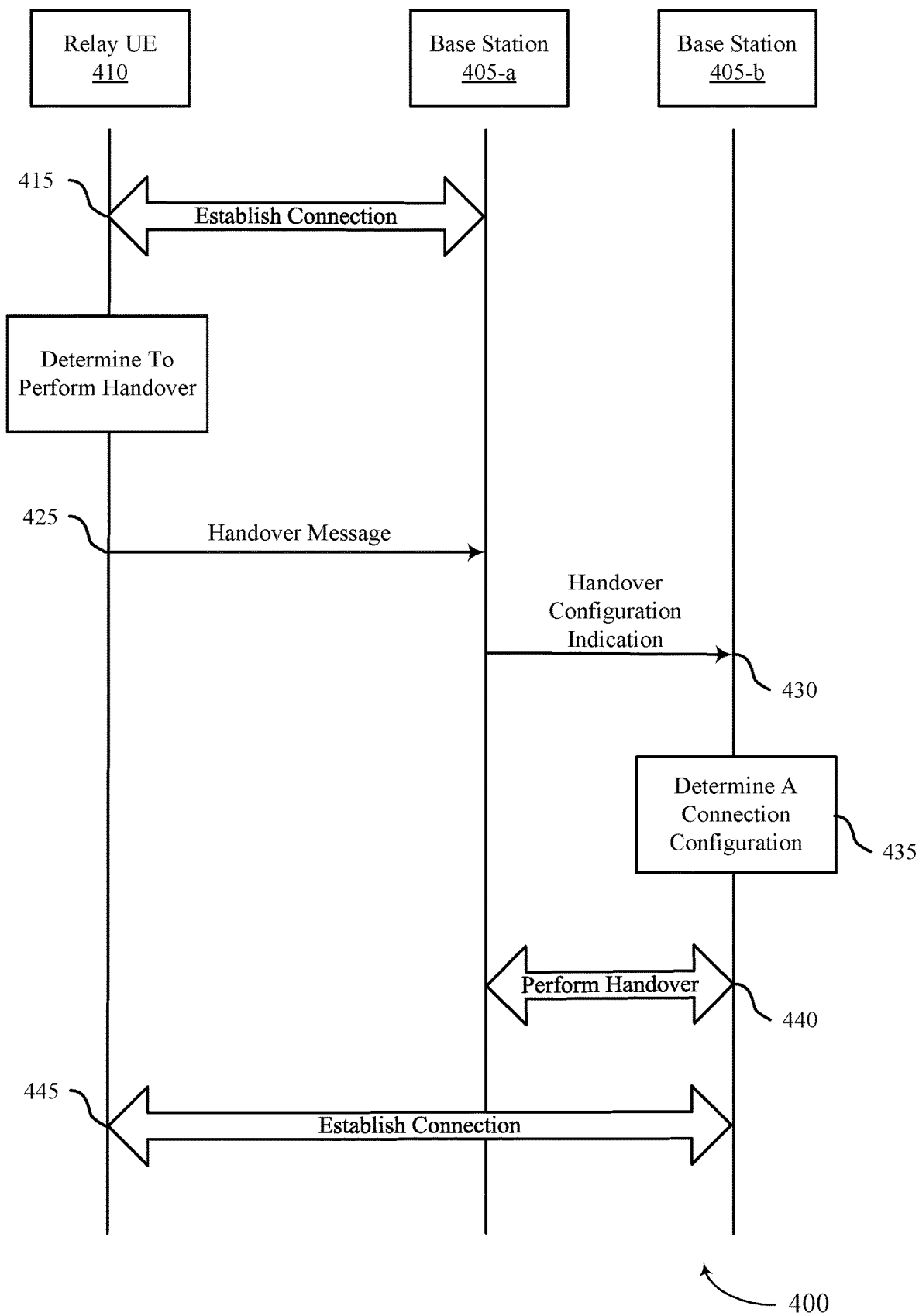
FIG. 4 illustrates an example of a process flow in accordance with aspects of the present disclosure.

FIG. 4 illustrates an example of a process flow 400 in accordance with various aspects of the present disclosure. In some examples, process flow 400 may implement aspects of wireless communications systems 100, 200, or 300 as described with reference to FIGS. 1 through 3.

Process flow 400 may include a relay UE 410 and base stations 405-a and 405-b, which may be respective examples of a relay UE 210 and 310 and base station 205 and 305 as described with reference to FIGS. 1 through 3.

At 415, base station 405-a and relay UE 410 may establish a connection. In some examples, this connection may be by a mmW.

At 420, relay UE 410 may determine to perform a handover from base station 405-a to base station 405-b. In some instances, this determination may be based on a location of relay UE 410 with respect to base station 405-a or 405-b, a speed of relay UE 410 relative to base station 405-a or 405-b, a time of connection of relay UE 410 with base station 405-a, a time duration between handover procedures, or any combination thereof. In some other instances, this determination may be based on a RTT of communication with base station 405-a or base station 405-b, an RSRP of base station 405-b, the AoA of base station 405-a or 405-b, the AoD of base station 405-a or 405-b, or any combination thereof.

At 425, relay UE 410 may transmit a handover message to base station 405-a including a handover configuration. The handover configuration may identify a beam associated with base station 405-b and a handover time by which relay UE 410 intends to attempt to communicate with base station 405-b via the beam. This transmission may be based on relay UEs 410 determination to perform a handover.

At 430, base station 405-a may transmit an indication of the handover configuration to the second base station 405-b. Base station 405-a may transmit an indication based on the handover message base station 405-a received from the relay UE 410. The handover indication may include identifying a beam associated with the second base station 405-b and a handover time by which the relay UE 410 intends to attempt to communicate with the second base station 405-b via the beam.

At 435, base station 405-b may determine a connection configuration for the relay UE 410. This connection configuration may be based on the handover configuration transmitted by relay UE 410 to base station 405-a in step 425. The connection configuration may include an allocation of resources to be used by relay UE 410 for the handover to base station 405-b. Base station 405-b may transmit a resource allocation indication for relay UE 410 to base station 405-a. Base station 405-a may in turn transmit (e.g., forward) the resource allocation indication for relay UE 410 to relay UE 410.

At 440, base station 405-a may perform a handover of relay UE 410 with base station 405-b. This handover may be based on the handover configuration transmitted from relay UE 410 to base station 405-a in step 425. Base station 405-a may release resources associated with the connection based on a handover time.

At 445, relay UE 410 and base station 405-b may establish a connection. The connection may be established in accordance with the handover configuration determined in step 425. This connection may be in addition to or instead of relay UEs 410 connection with base station 405-a. The connection established may be in accordance with the connection configuration determined by base station 405-b in step 435. This connection may be established without using random access procedure.

Figure 5:
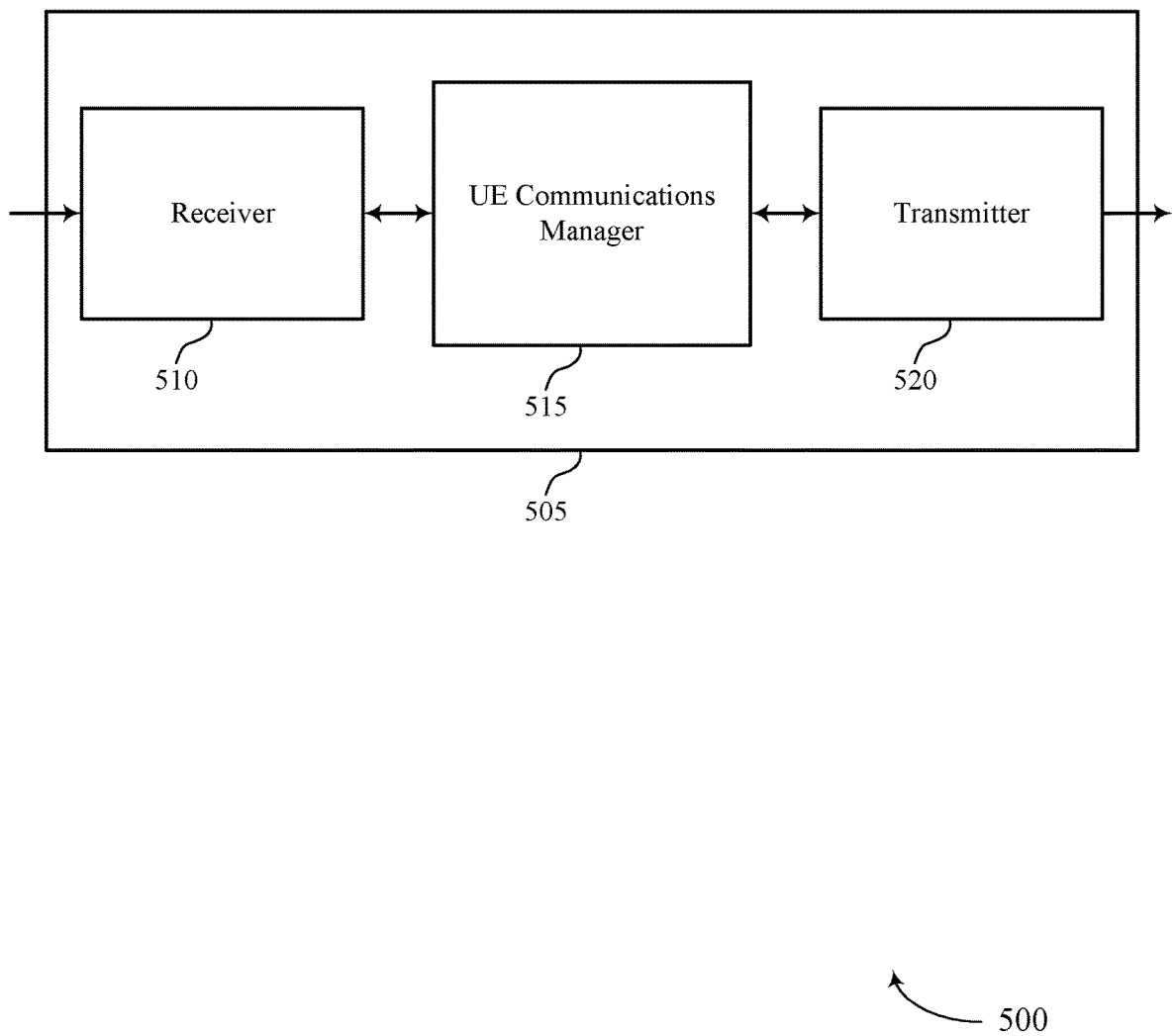
FIGS. 5 through 7 show block diagrams of a device in accordance with aspects of the present disclosure.

FIG. 5 shows a block diagram 500 of a wireless device 505 in accordance with aspects of the present disclosure. Wireless device 505 may be an example of aspects of a UE or relay UE as described herein. Wireless device 505 may include receiver 510, UE communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to handover schemes for mmW wireless communications, etc.). Information may be passed on to other components of the device. The receiver 510 may be an example of aspects of the transceiver 835 described with reference to FIG. 8. The receiver 510 may utilize a single antenna or a set of antennas.

UE communications manager 515 may be an example of aspects of the UE communications manager 815 described with reference to FIG. 8. UE communications manager 515 and/or at least some of its various sub-components may be implemented in hardware, software executed by a processor, firmware, or any combination thereof. If implemented in software executed by a processor, the functions of the UE communications manager 515 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 515 and/or at least some of its various sub-components may be physically located at various positions, including being distributed such that portions of functions are implemented at different physical locations by one or more physical devices. In some examples, UE communications manager 515 and/or at least some of its various sub-components may be a separate and distinct component in accordance with various aspects of the present disclosure. In other examples, UE communications manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 515 may establish, by a mmW UE (e.g., UE 115, relay UE 210, relay UE 310, relay UE 410), a first connection with a first base station (e.g., base station 105, base station 205, base station 305, base station 405) and determine, by the mmW UE, to perform handover from the first base station to a second base station (e.g., base station 105, base station 205, base station 305, base station 405). UE communications manager 515 may transmit, based on the determination to perform handover, a handover message including a handover configuration identifying a beam associated with the second base station and a handover time by which the mmW UE intends to attempt to communicate with the second base station via the beam, and establish, by the mmW UE, a second connection with the second base station in accordance with the handover configuration.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may utilize a single antenna or a set of antennas.

Figure 6:
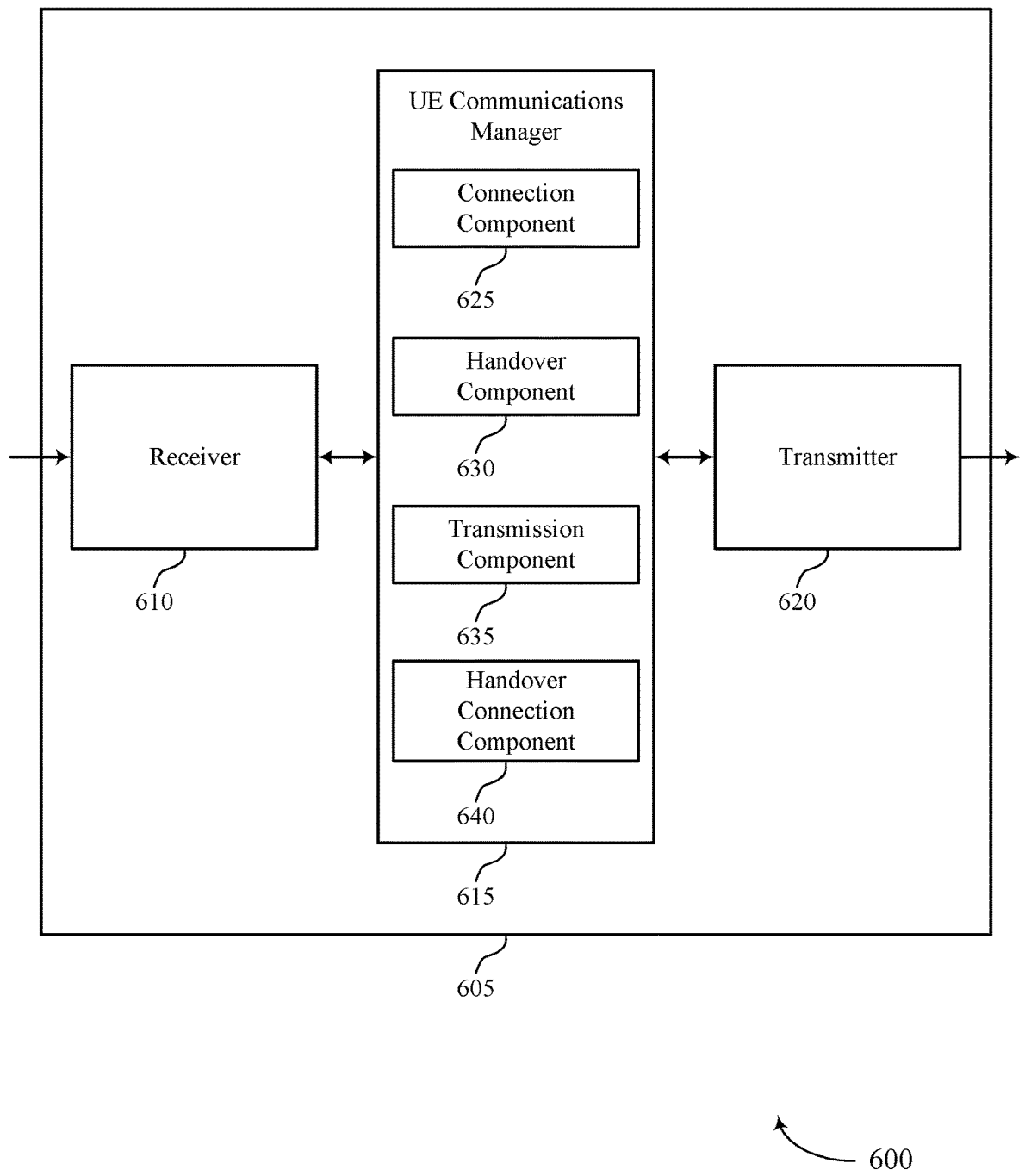

FIG. 6 shows a block diagram 600 of a wireless device 605 in accordance with aspects of the present disclosure. Wireless device 605 may be an example of aspects of a wireless device 505, a UE, or a relay UE as described with reference to FIGS. 1-5. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to handover schemes for mmW wireless communications, etc.). Information may be passed on to other components of the device. The receiver 610 may be an example of aspects of the transceiver 835 described with reference to FIG. 8. The receiver 610 may utilize a single antenna or a set of antennas.

UE communications manager 615 may be an example of aspects of the UE communications manager 815 described with reference to FIG. 8. UE communications manager 615 may also include connection component 625, handover component 630, transmission component 635, and handover connection component 640.

Connection component 625 may establish, by a mmW UE (e.g., UE 115, relay UE 210, relay UE 310, relay UE 410), a first connection with a first base station (e.g., base station 105, base station 205, base station 305, base station 405). In some cases, the second connection is established without using a random access procedure. In some cases, the mmW UE is associated with a high speed train. In some cases, the mmW UE is a relay UE for a set of UEs (e.g., UE 115, UE 215, UE 315).

Handover component 630 may determine, by the mmW UE, to perform handover from the first base station to a second base station (e.g., base station 105, base station 205, base station 305, base station 405). In some cases, determining to perform handover includes triggering a handover procedure based on a location of the mmW UE with respect to the first base station or the second base station, a speed of the mmW UE relative to the first base station or the second base station, a time of connection of the mmW UE with the first base station, a time duration between handover procedures, or any combination thereof. In some cases, determining to perform handover includes triggering a handover procedure based on a round trip time of a communication with the first base station or the second base station, a RSRP of a signal of the second base station, a beam angle of arrival of the first base station or the second base station, a beam angle of departure of the first base station or the second base station, or any combination thereof.

Transmission component 635 may transmit, based on the determination to perform handover, a handover message including a handover configuration identifying a beam associated with the second base station and a handover time by which the mmW UE intends to attempt to communicate with the second base station via the beam.

Handover connection component 640 may establish, by the mmW UE, a second connection with the second base station in accordance with the handover configuration.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas.

Figure 7:
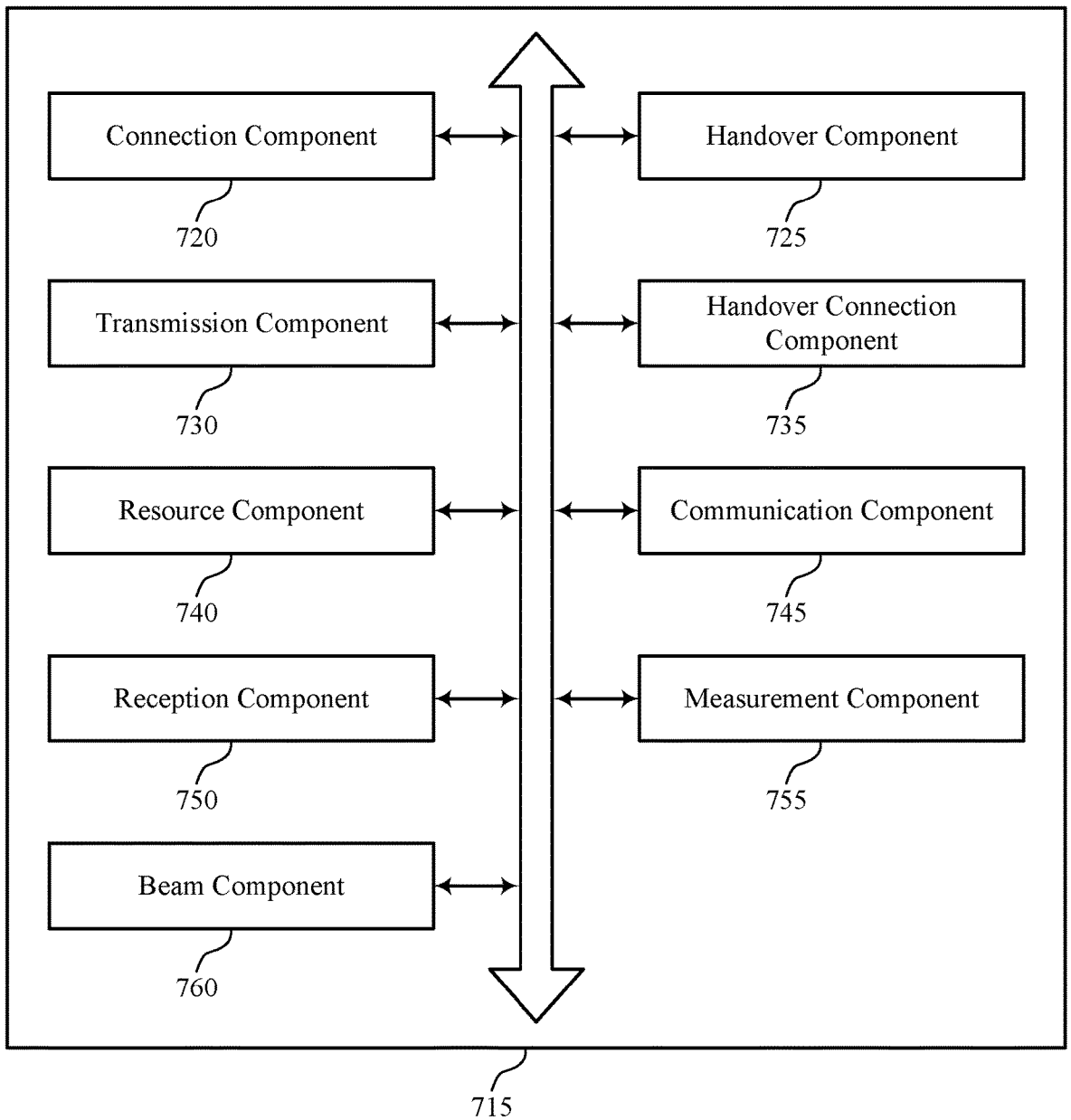

FIG. 7 shows a block diagram 700 of a UE communications manager 715 in accordance with aspects of the present disclosure. The UE communications manager 715 may be an example of aspects of a UE communications manager 515, a UE communications manager 615, or a UE communications manager 815 described with reference to FIGS. 5, 6, and 8. The UE communications manager 715 may include connection component 720, handover component 725, transmission component 730, handover connection component 735, resource component 740, communication component 745, reception component 750, measurement component 755, and beam component 760. Each of these modules may communicate, directly or indirectly, with one another (e.g., via one or more buses).

Connection component 720 may establish, by a mmW UE (e.g., UE 115, relay UE 210, relay UE 310, relay UE 410), a first connection with a first base station (e.g., base station 105, base station 205, base station 305, base station 405). In some cases, the second connection is established without using a random access procedure. In some cases, the mmW UE is associated with a high speed train. In some cases, the mmW UE is a relay UE for a set of UEs (e.g., UE 115, UE 215, UE 315).

Handover component 725 may determine, by the mmW UE, to perform handover from the first base station to a second base station (e.g., base station 105, base station 205, base station 305, base station 405). In some cases, determining to perform handover includes triggering a handover procedure based on a location of the mmW UE with respect to the first base station or the second base station, a speed of the mmW UE relative to the first base station or the second base station, a time of connection of the mmW UE with the first base station, a time duration between handover procedures, or any combination thereof. In some cases, determining to perform handover includes triggering a handover procedure based on a round trip time of a communication with the first base station or the second base station, a RSRP of a signal of the second base station, a beam angle of arrival of the first base station or the second base station, a beam angle of departure of the first base station or the second base station, or any combination thereof.

Transmission component 730 may transmit, based on the determination to perform handover, a handover message including a handover configuration identifying a beam associated with the second base station and a handover time by which the mmW UE intends to attempt to communicate with the second base station via the beam.

Handover connection component 735 may establish, by the mmW UE, a second connection with the second base station in accordance with the handover configuration.

Resource component 740 may release resources associated with the first connection based on the handover time and receive a resource allocation for establishing the second connection. In some cases, the resource allocation is included in a connection configuration. In some cases, resource component 740 may determine a beam index for establishing the second connection. In some cases, the beam index is included in a connection configuration.

Communication component 745 may communicate with the second base station according to the resource allocation. In some cases, communication component may communicate with the second base station according to the beam index.

Reception component 750 may receive, at the mmW UE, a reference signal from the second base station, receive control information from the second base station based on the beam associated with the second base station, and receive a connection configuration from the first base station or second base station, the connection configuration being based on the handover configuration. In some cases, the reference signal includes a CSI-RS or an SS.

Measurement component 755 may perform a measurement of the reference signal received from the second base station, identify a measurement configuration that includes a measurement window, where the measurement is performed based on the measurement configuration, and include a measurement report based on the measurement of the reference signal in the handover message. In some cases, identifying the measurement configuration includes receiving an indication of the measurement configuration from the first base station.

Beam component 760 may determine the beam associated with the second base station based on the reference signal, predict a beam pair link between the mmW UE and the second base station based on the beam associated with the second base station, and communicate with the second base station based on the predicted beam pair link. In some cases, the beam associated with the second base station is determined based on a signal strength of a beam associated with the reference signal satisfying a threshold.

Figure 8:
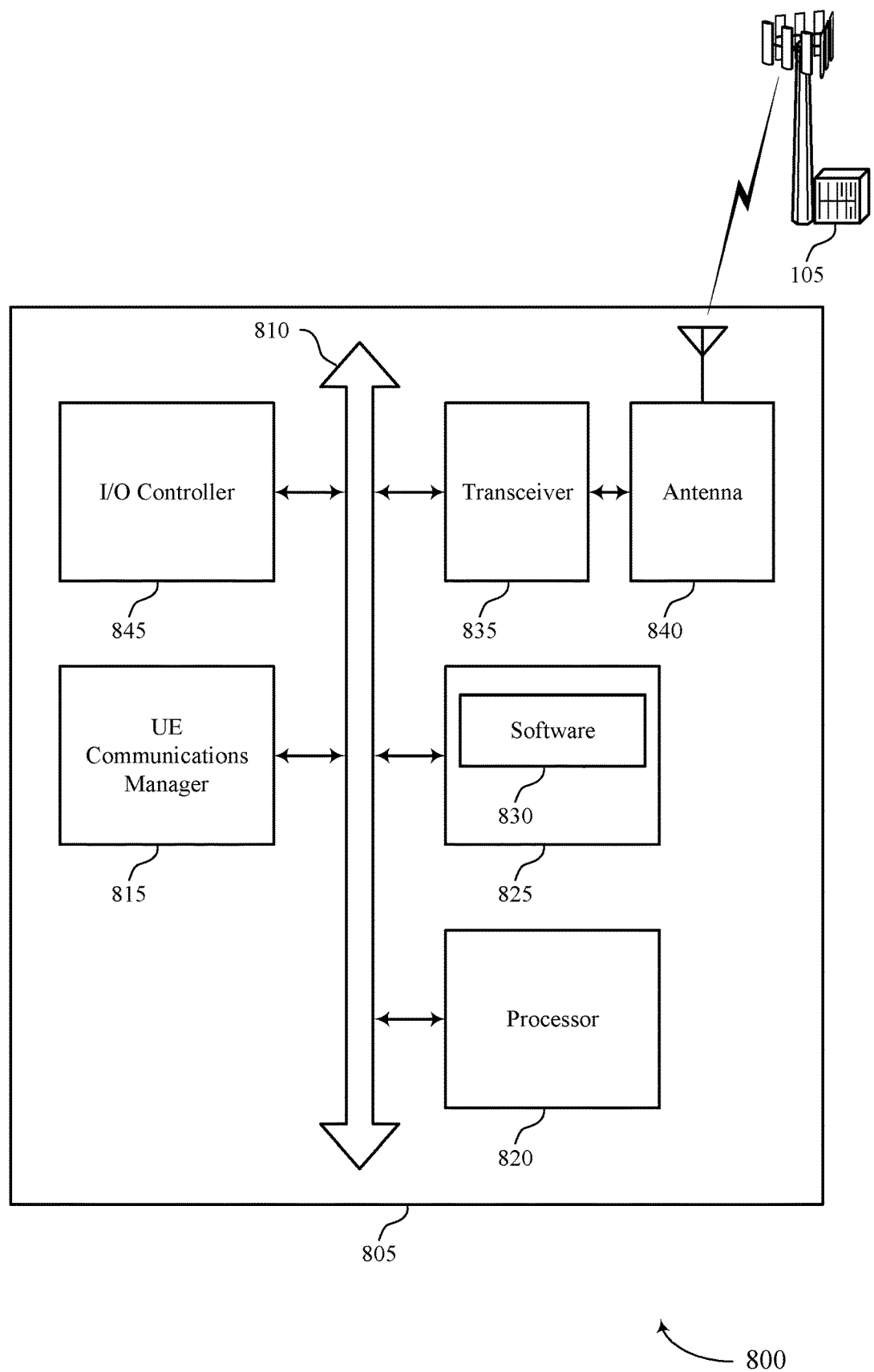
FIG. 8 illustrates a block diagram of a system including a user equipment (UE) in accordance with aspects of the present disclosure.

FIG. 8 shows a diagram of a system 800 including a device 805 in accordance with aspects of the present disclosure. Device 805 may be an example of or include the components of wireless device 505, wireless device 605, a UE or a relay UE as described herein, e.g., with reference to FIGS. 1-6. Device 805 may include components for bi-directional voice and data communications including components for transmitting and receiving communications, including UE communications manager 815, processor 820, memory 825, software 830, transceiver 835, antenna 840, and I/O controller 845. These components may be in electronic communication via one or more buses (e.g., bus 810). Device 805 may communicate wirelessly with one or more base stations 105.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting handover schemes for mmW wireless communications).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Software 830 may include code to implement aspects of the present disclosure, including code to support handover schemes for mmW wireless communications. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described herein. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the device 805 may include a single antenna 840. However, in some cases the device 805 may have more than one antenna 840, which may be capable of concurrently transmitting or receiving multiple wireless transmissions.

I/O controller 845 may manage input and output signals for device 805. I/O controller 845 may also manage peripherals not integrated into device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system. In other cases, I/O controller 845 may represent or interact with a modem, a keyboard, a mouse, a touchscreen, or a similar device. In some cases, I/O controller 845 may be implemented as part of a processor. In some cases, a user may interact with device 805 via I/O controller 845 or via hardware components controlled by I/O controller 845.

Figure 9:
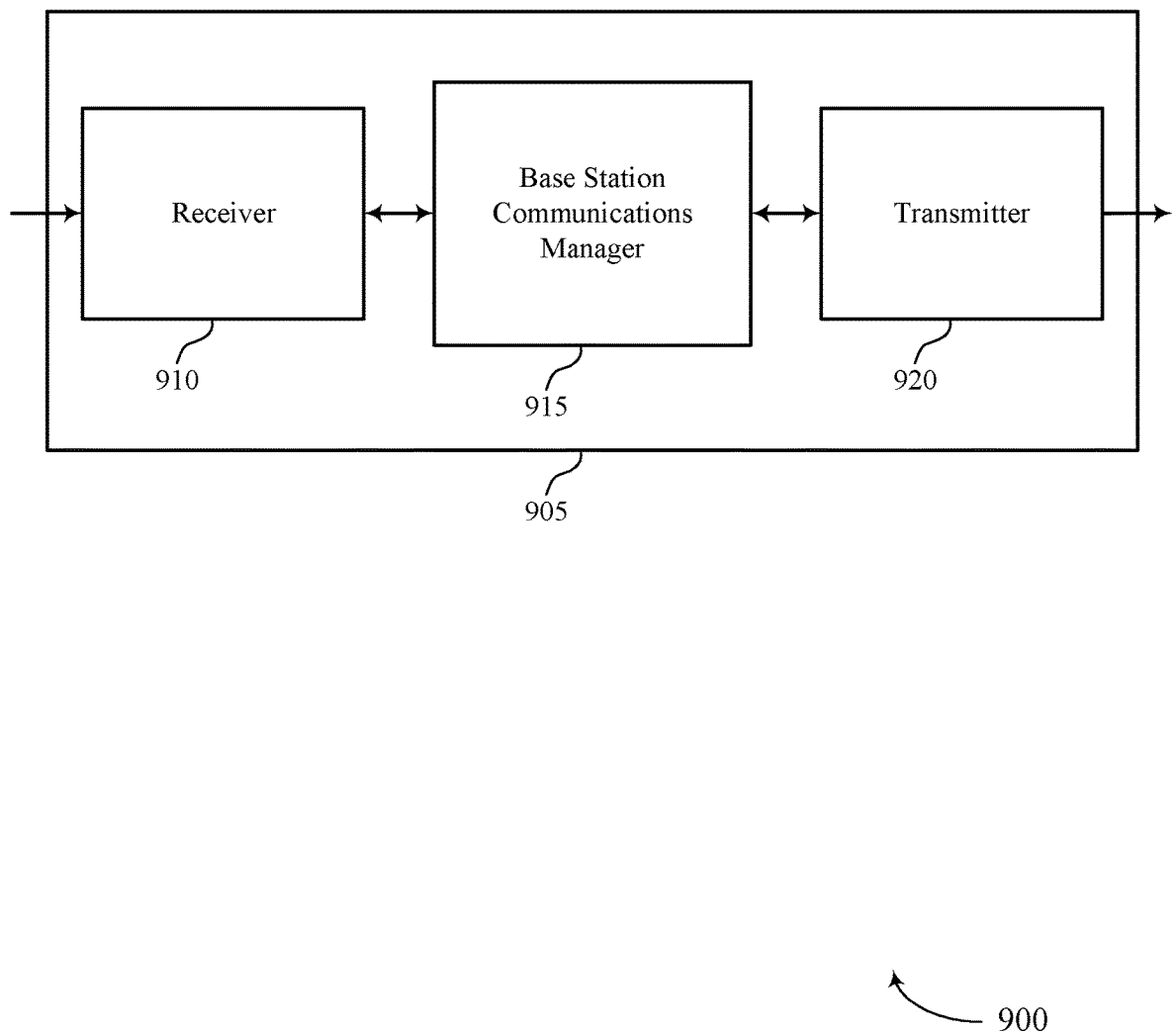
FIGS. 9 through 11 show block diagrams of a device in accordance with aspects of the present disclosure.

FIG. 9 shows a block diagram 900 of a wireless device 905 in accordance with aspects of the present disclosure. Wireless device 905 may be an example of aspects of a base station as described herein. Wireless device 905 may include receiver 910, base station communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to handover schemes for mmW wireless communications, etc.). Information may be passed on to other components of the device. The receiver 910 may be an example of aspects of the transceiver 1235 described with reference to FIG. 12. The receiver 910 may utilize a single antenna or a set of antennas.

Base station communications manager 915 may be an example of aspects of the base station communications manager 1215 described with reference to FIG. 12. Base station communications manager 915 and/or at least some of its various sub-components may be implemented in hardware, software executed by a processor, firmware, or any combination thereof. If implemented in software executed by a processor, the functions of the base station communications manager 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 915 and/or at least some of its various sub-components may be physically located at various positions, including being distributed such that portions of functions are implemented at different physical locations by one or more physical devices. In some examples, base station communications manager 915 and/or at least some of its various sub-components may be a separate and distinct component in accordance with various aspects of the present disclosure. In other examples, base station communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

When operating in accordance with a first base station (e.g., a current or source base station), base station communications manager 915 may establish, at a first base station (e.g., a base station 105, a base station 205, a base station 305, a base station 405), a first connection with a mmW UE (e.g., a UE 115, a relay UE 210, a relay UE 310, a relay UE 410) and receive, from the mmW UE, a handover message that includes a handover configuration for a second base station (e.g., base station 105, base station 205, base station 305, base station 405), the handover configuration identifying a beam associated with the second base station and a handover time by which the mmW UE intends to attempt to communicate with the second base station via the beam. Base station communications manager 915 may transmit, based on the handover message, an indication of the handover configuration to the second base station, and perform handover of the mmW UE from the first base station to the second base station based on the handover configuration.

When operating in accordance with a second base station (e.g., a new or target base station), base station communications manager 915 may receive, at a second base station and from a first base station, a handover configuration for a mmW UE, the handover configuration identifying a beam associated with the second base station and a handover time by which the mmW UE intends to attempt to communicate with the second base station via the beam. Base station communications manager 915 may determine a connection configuration for the mmW UE based on the handover configuration, the connection configuration including an allocation of resources to be used by the mmW UE for handover to the second base station, and perform handover of the mmW UE from the first base station to the second base station based on the connection configuration.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Figure 10:
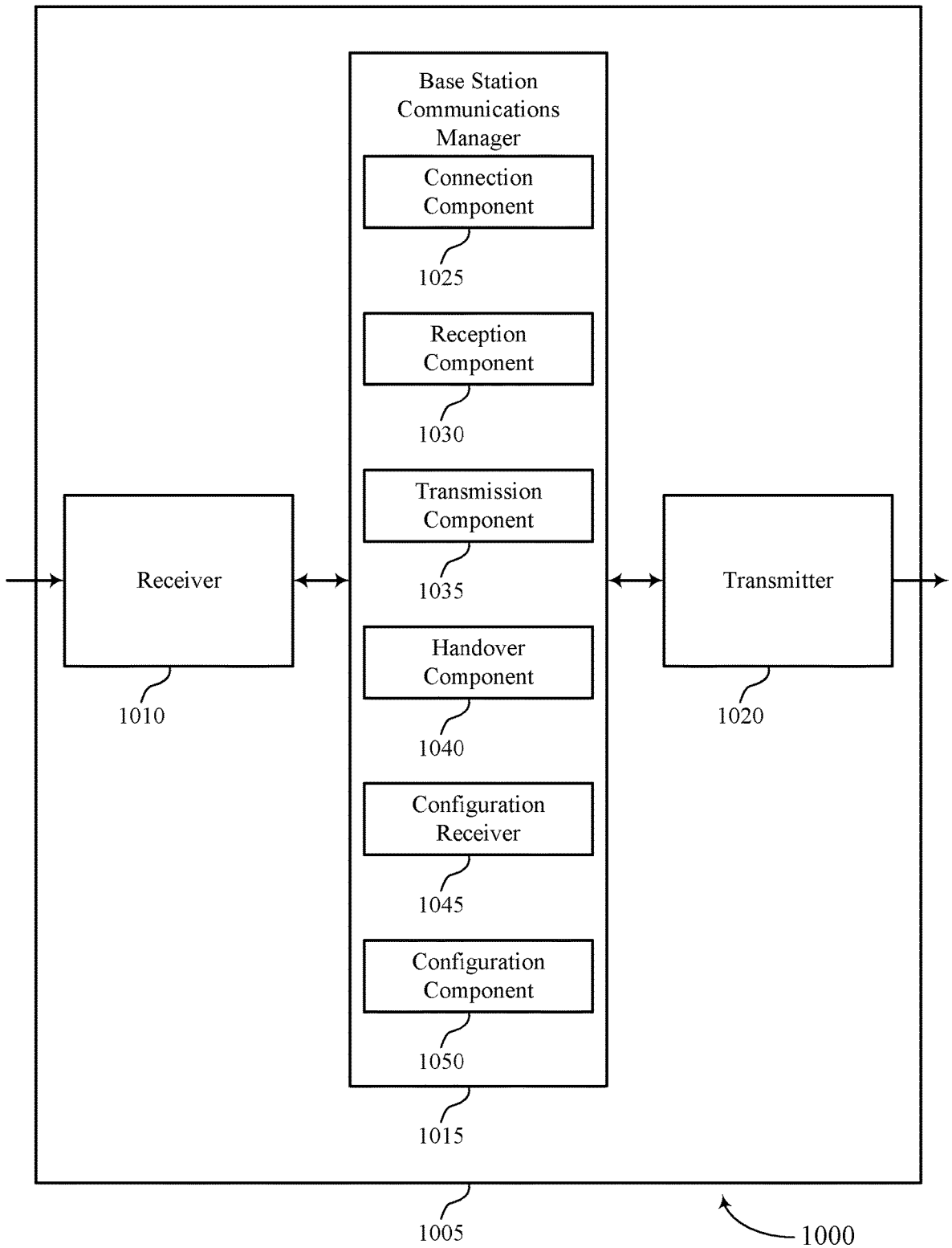

FIG. 10 shows a block diagram 1000 of a wireless device 1005 in accordance with aspects of the present disclosure. Wireless device 1005 may be an example of aspects of a wireless device 905 or a base station as described with reference to FIGS. 1-4 and FIG. 9. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to handover schemes for mmW wireless communications, etc.). Information may be passed on to other components of the device. The receiver 1010 may be an example of aspects of the transceiver 1235 described with reference to FIG. 12. The receiver 1010 may utilize a single antenna or a set of antennas.

Base station communications manager 1015 may be an example of aspects of the base station communications manager 1215 described with reference to FIG. 12. Base station communications manager 1015 may also include a connection component 1025, a reception component 1030, a transmission component 1035, a handover component 1040, a configuration receiver 1045, and a configuration component 1050.

When operating in accordance with a first base station (e.g., a source or current base station), the base station communications manager 1015 may utilize the connection component 1025, the reception component 1030, the transmission component 1035, and the handover component 1040. Connection component 1025 may establish, at a first base station (e.g., a base station 105, a base station 205, a base station 305, a base station 405), a first connection with a mmW UE (e.g., a UE 115, a relay UE 210, a relay UE 310, a relay UE 410). In some cases, the mmW UE is associated with a high speed train. In some cases, the mmW UE is a relay UE for a set of UEs (e.g., UE 115, UE 215, UE 315).

Reception component 1030 may receive, from the mmW UE, a handover message that includes a handover configuration for a second base station (e.g., a base station 105, a base station 205, a base station 305, a base station 405), the handover configuration identifying a beam associated with the second base station and a handover time by which the mmW UE intends to attempt to communicate with the second base station via the beam. Reception component 1030 may receive, from the second base station, a connection configuration for the mmW UE and receive, from the second base station, a resource allocation for the mmW UE. In some cases, reception component 1030 may receive, from the mmW UE, a beam index for the second base station.

Transmission component 1035 may transmit, based on the handover message, an indication of the handover configuration to the second base station. Transmission component 1035 may transmit the connection configuration to the mmW UE prior to performing handover and transmit, to the mmW UE, an indication of the resource allocation. In some cases, transmission component 1035 may transmit, to the second base station, an indication of the beam index.

Handover component 1040 may perform handover of the mmW UE from the first base station to the second base station based on the handover configuration. In some cases, the handover is performed without using a random access procedure.

When operating in accordance with a second base station (e.g., a new or target base station), the base station communications manager 1015 may utilize the reception component 1030, the transmission component 1035, the handover component 1040, the configuration receiver 1045, and the configuration component 1050. Configuration receiver 1045 may receive, at a second base station and from a first base station, a handover configuration for a mmW UE, the handover configuration identifying a beam associated with the second base station and a handover time by which the mmW UE intends to attempt to communicate with the second base station via the beam. In some cases, the mmW UE is associated with a high speed train. In some cases, the mmW UE is a relay UE for a set of UEs.

Configuration component 1050 may determine a connection configuration for the mmW UE based on the handover configuration, the connection configuration including an allocation of resources to be used by the mmW UE for handover to the second base station. In some cases, determining the connection configuration includes determining a resource allocation for establishing a connection with the mmW UE. In some cases, configuration component may determine a beam index for establishing a connection with the mmW UE.

Handover component 1040 may perform handover of the mmW UE from the first base station to the second base station based on the connection configuration. In some cases, the handover is performed without using a random access procedure.

Transmission component 1035 may transmit, to the mmW UE, a reference signal, where handover is performed based on the reference signal, and transmit the measurement configuration to the mmW UE or the first base station, where the measurement report is based on a measurement configuration.

Reception component 1030 may receive, from the mmW UE, a measurement report of the reference signal.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
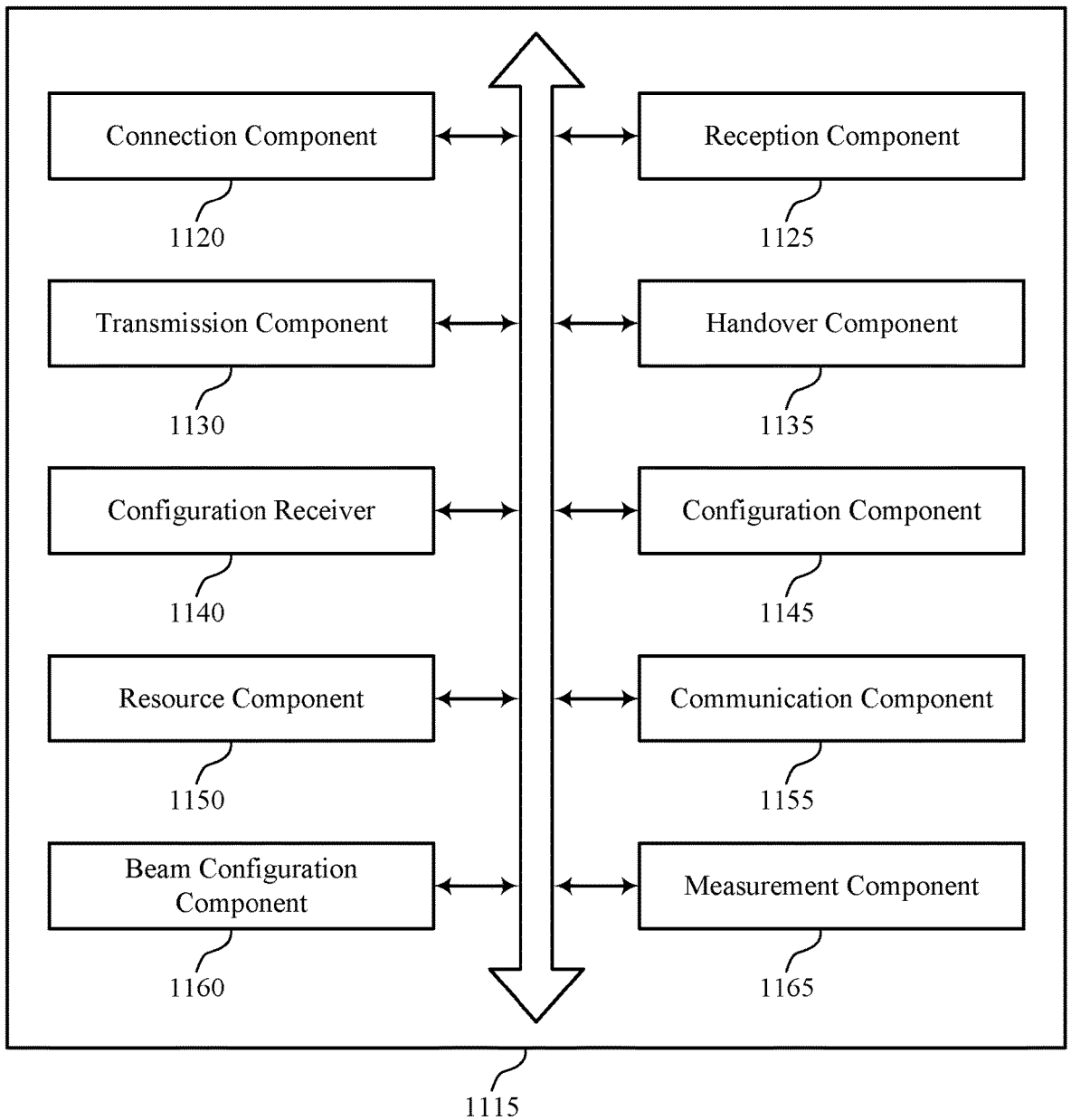

FIG. 11 shows a block diagram 1100 of a base station communications manager 1115 in accordance with aspects of the present disclosure. The base station communications manager 1115 may be an example of aspects of a base station communications manager 1215 described with reference to FIGS. 9, 10, and 12. The base station communications manager 1115 may include a connection component 1120, a reception component 1125, a transmission component 1130, handover component 1135, a configuration receiver 1140, a configuration component 1145, a resource component 1150, a communication component 1155, a beam configuration component 1160, and a measurement component 1165. Each of these modules may communicate, directly or indirectly, with one another (e.g., via one or more buses).

When operating in accordance with a first base station (e.g., a current or source base station), the base station communications manager 1115 may utilize the connection component 1120, the reception component 1125, the transmission component 1130, the handover component 1135, and the resource component 1150. Connection component 1120 may establish, at a first base station (e.g., a base station 105, a base station 205, a base station 305, a base station 405), a first connection with a mmW UE (e.g., a UE 115, a relay UE 210, a relay UE 310, a relay UE 410). In some cases, the mmW UE is associated with a high speed train. In some cases, the mmW UE is a relay UE for a set of UEs (e.g., a UE 115, a UE 215, a UE 315).

Reception component 1125 may receive, from the mmW UE, a handover message that includes a handover configuration for a second base station (e.g., a base station 105, a base station 205, a base station 305, a base station 405), the handover configuration identifying a beam associated with the second base station and a handover time by which the mmW UE intends to attempt to communicate with the second base station via the beam, receive, from the second base station, a connection configuration for the mmW UE, receive, from the second base station, a resource allocation for the mmW UE. In some cases, reception component 1125 may receive, from the mmW UE, a beam index for the second base station.

Transmission component 1130 may transmit, based on the handover message, an indication of the handover configuration to the second base station, transmit the connection configuration to the mmW UE prior to performing handover and transmit, to the mmW UE, an indication of the resource allocation. In some cases, transmission component 1130 may transmit, to the second base station, an indication of the beam index.

Handover component 1135 may perform handover of the mmW UE from the first base station to the second base station based on the handover configuration. In some cases, the handover is performed without using a random access procedure.

Resource component 1150 may release resources associated with the first connection based on the handover time.

When operating in accordance with a second base station (e.g., a new or target base station), the base station communications manager 1115 may utilize the reception component 1125, the transmission component 1130, the handover component 1135, the configuration receiver 1140, the configuration component 1145, the communication component 1155, the beam configuration component 1160, and the measurement component 1165.

Configuration receiver 1140 may receive, at a second base station and from a first base station, a handover configuration for a mmW UE, the handover configuration identifying a beam associated with the second base station and a handover time by which the mmW UE intends to attempt to communicate with the second base station via the beam. In some cases, the mmW UE is associated with a high speed train. In some cases, the mmW UE is a relay UE for a set of UEs.

Configuration component 1145 may determine a connection configuration for the mmW UE based on the handover configuration, the connection configuration including an allocation of resources to be used by the mmW UE for handover to the second base station. In some cases, determining the connection configuration includes determining a resource allocation for establishing a connection with the mmW UE. In some cases, configuration component 1145 may determine a beam index for establishing a connection with the mmW UE.

Handover component 1135 may perform handover of the mmW UE from the first base station to the second base station based on the connection configuration. In some cases, the handover is performed without using a random access procedure.

Communication component 1155 may communicate with the mmW UE according to the resource allocation.

Measurement component 1165 may identify a measurement configuration that includes a measurement window.

Transmission component 1130 may transmit, to the mmW UE, a reference signal, where handover is performed based on the reference signal and transmit the measurement configuration to the mmW UE or the first base station.

Reception component 1125 may receive, from the mmW UE, a measurement report of the reference signal. In some cases, the measurement report is based on the measurement configuration. Beam configuration component 1160 may determine a beam configuration for the mmW UE based on the measurement report.

Figure 12:
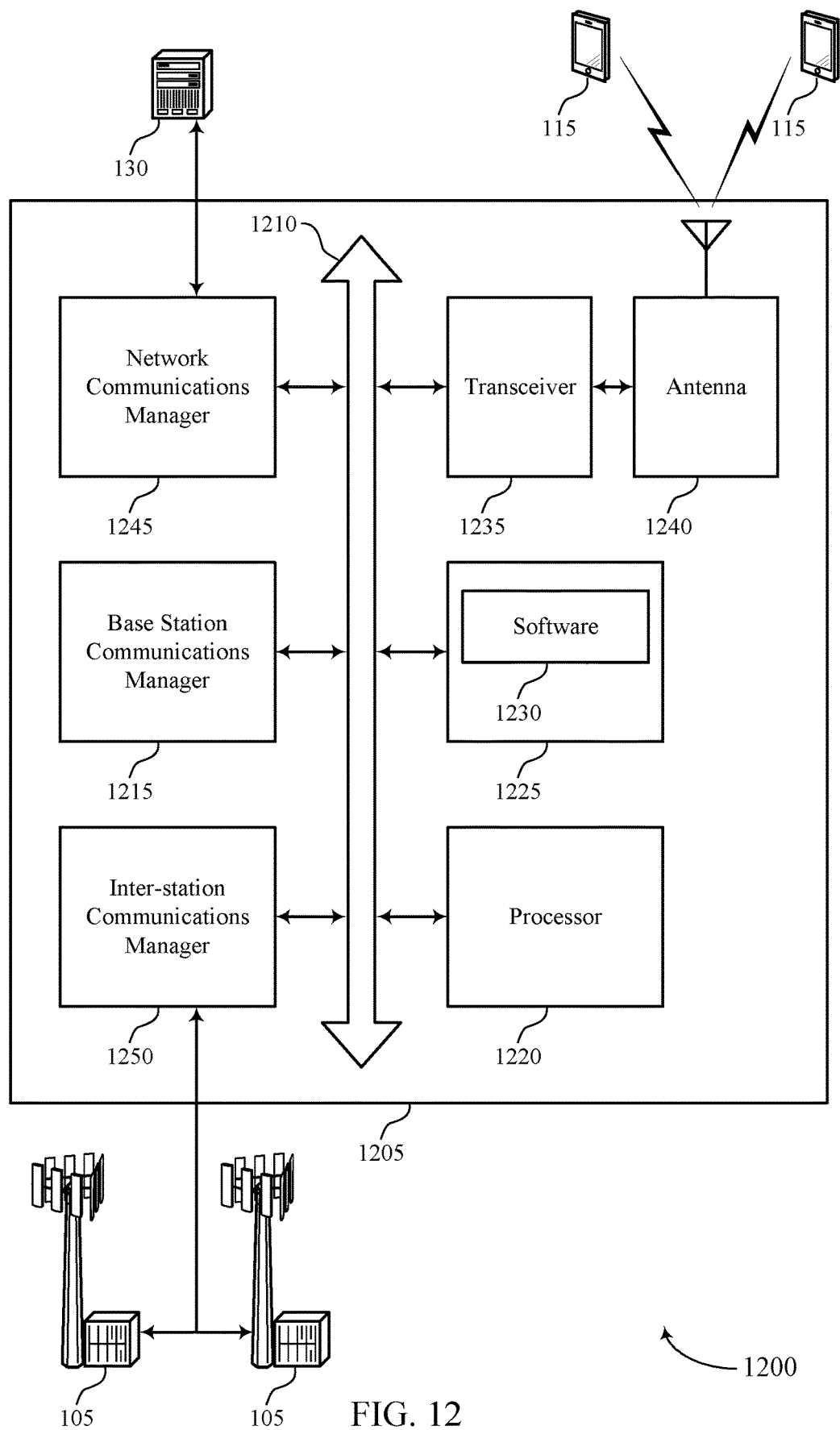
FIG. 12 illustrates a block diagram of a system including a base station in accordance with aspects of the present disclosure.

FIG. 12 shows a diagram of a system 1200 including a device 1205 in accordance with aspects of the present disclosure. Device 1205 may be an example of or include the components of a base station as described herein, e.g., with reference to FIG. 1-4, FIG. 8 and FIG. 9. Device 1205 may include components for bi-directional voice and data communications including components for transmitting and receiving communications, including base station communications manager 1215, processor 1220, memory 1225, software 1230, transceiver 1235, antenna 1240, network communications manager 1245, and inter-station communications manager 1250. These components may be in electronic communication via one or more buses (e.g., bus 1210). Device 1205 may communicate wirelessly with one or more UEs 115.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting handover schemes for mmW wireless communications).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware or software operation such as the interaction with peripheral components or devices.

Software 1230 may include code to implement aspects of the present disclosure, including code to support handover schemes for mmW wireless communications. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described herein. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the device 1205 may include a single antenna 1240. However, in some cases the device 1205 may have more than one antenna 1240, which may be capable of concurrently transmitting or receiving multiple wireless transmissions.

Network communications manager 1245 may manage communications with the core network (e.g., via one or more wired backhaul links). For example, the network communications manager 1245 may manage the transfer of data communications for client devices, such as one or more UEs 115.

Inter-station communications manager 1250 may manage communications with other base station 105, and may include a controller or scheduler for controlling communications with UEs 115 in cooperation with other base stations 105. For example, the inter-station communications manager 1250 may coordinate scheduling for transmissions to UEs 115 for various interference mitigation techniques such as beamforming or joint transmission. In some examples, inter-station communications manager 1250 may provide an X2 interface within an LTE/LTE-A wireless communication network technology to provide communication between base stations 105.

Figure 13:
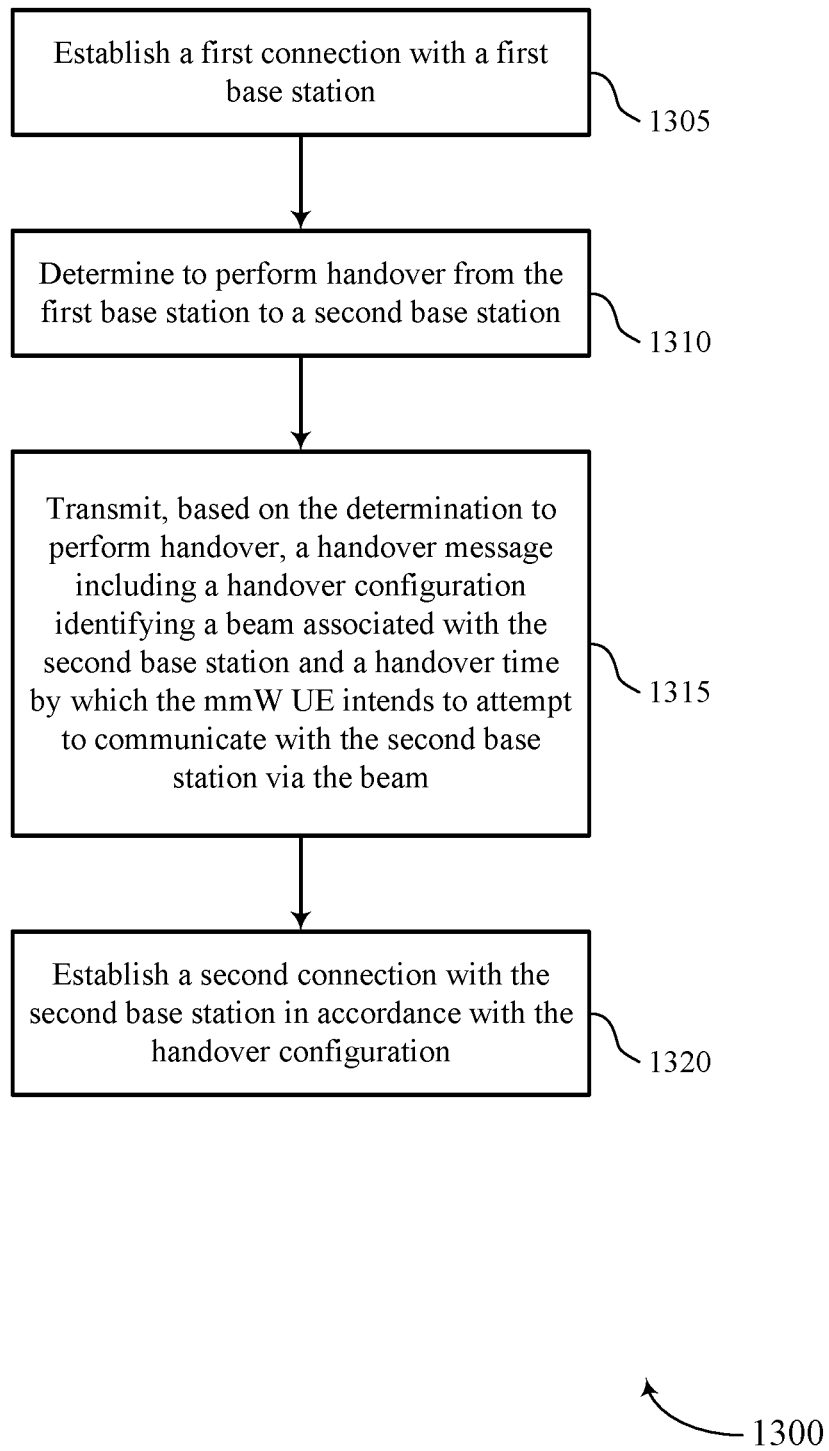
FIGS. 13 through 15 illustrate methods in accordance with aspects of the present disclosure.

FIG. 13 shows a flowchart illustrating a method 1300 in accordance with aspects of the present disclosure. The operations of method 1300 may be implemented by a UE 115 or its components as described herein. For example, the operations of method 1300 may be performed by a UE communications manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At 1305 the UE 115 may establish a first connection with a first base station. The operations of 1305 may be performed according to the methods described herein. In certain examples, aspects of the operations of 1305 may be performed by a connection component as described with reference to FIGS. 5 through 8.

At 1310 the UE 115 may determine to perform handover from the first base station to a second base station. The operations of 1310 may be performed according to the methods described herein. In certain examples, aspects of the operations of 1310 may be performed by a handover component as described with reference to FIGS. 5 through 8.

At 1315 the UE 115 may transmit, based at least in part on the determination to perform handover, a handover message including a handover configuration identifying a beam associated with the second base station and a handover time by which the mmW UE intends to attempt to communicate with the second base station via the beam. The operations of 1315 may be performed according to the methods described herein. In certain examples, aspects of the operations of 1315 may be performed by a transmission component as described with reference to FIGS. 5 through 8.

At 1320 the UE 115 may establish a second connection with the second base station in accordance with the handover configuration. The operations of 1320 may be performed according to the methods described herein. In certain examples, aspects of the operations of 1320 may be performed by a handover connection component as described with reference to FIGS. 5 through 8.

Figure 14:
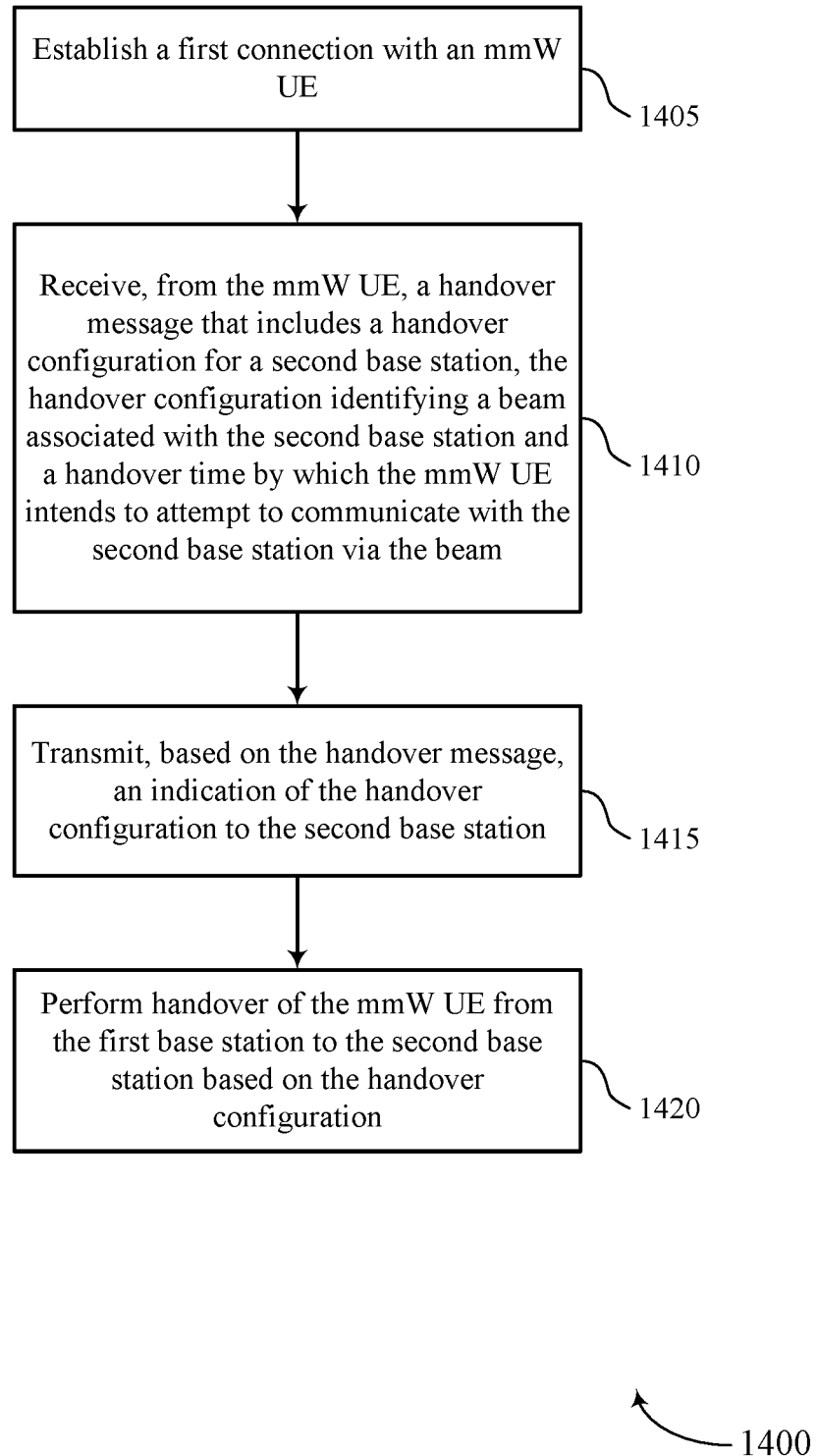

FIG. 14 shows a flowchart illustrating a method 1400 in accordance with aspects of the present disclosure. The operations of method 1400 may be implemented by a base station 105 or its components as described herein. For example, the operations of method 1400 may be performed by a base station communications manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At 1405 the base station 105 may establish a first connection with a mmW UE. The operations of 1405 may be performed according to the methods described herein. In certain examples, aspects of the operations of 1405 may be performed by a connection component as described with reference to FIGS. 9 through 12.

At 1410 the base station 105 may receive, from the mmW UE, a handover message that includes a handover configuration for a second base station, the handover configuration identifying a beam associated with the second base station and a handover time by which the mmW UE intends to attempt to communicate with the second base station via the beam. The operations of 1410 may be performed according to the methods described herein. In certain examples, aspects of the operations of 1410 may be performed by a reception component as described with reference to FIGS. 9 through 12.

At 1415 the base station 105 may transmit, based at least in part on the handover message, an indication of the handover configuration to the second base station. The operations of 1415 may be performed according to the methods described herein. In certain examples, aspects of the operations of 1415 may be performed by a transmission component as described with reference to FIGS. 9 through 12.

At 1420 the base station 105 may perform handover of the mmW UE from the first base station to the second base station based at least in part on the handover configuration. The operations of 1420 may be performed according to the methods described herein. In certain examples, aspects of the operations of 1420 may be performed by a handover component as described with reference to FIGS. 9 through 12.

Figure 15:
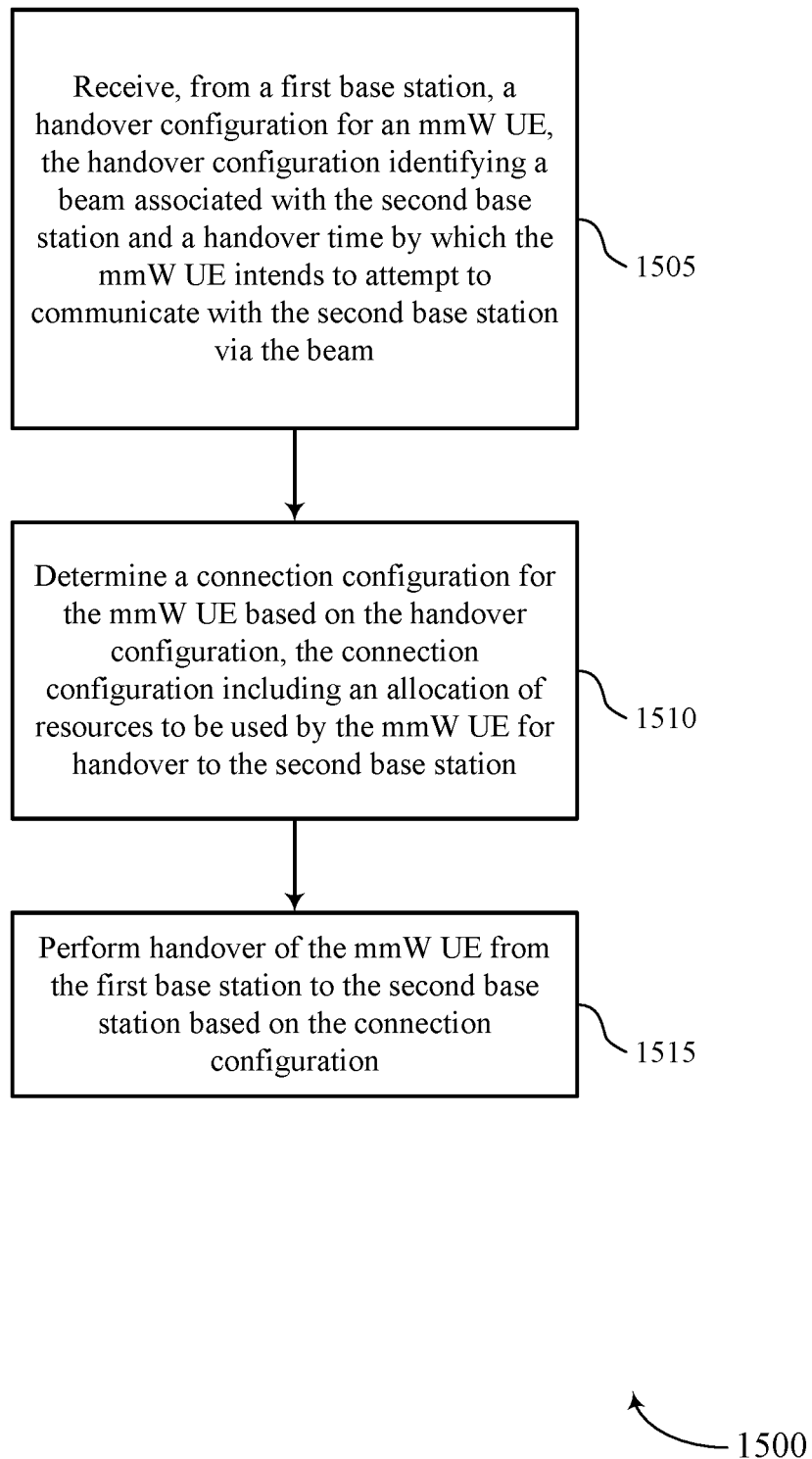

FIG. 15 shows a flowchart illustrating a method 1500 in accordance with aspects of the present disclosure. The operations of method 1500 may be implemented by a base station 105 or its components as described herein. For example, the operations of method 1500 may be performed by a base station communications manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At 1505 the base station 105 may receive, at a second base station and from a first base station, a handover configuration for a mmW UE, the handover configuration identifying a beam associated with the second base station and a handover time by which the mmW UE intends to attempt to communicate with the second base station via the beam. The operations of 1505 may be performed according to the methods described herein. In certain examples, aspects of the operations of 1505 may be performed by a configuration receiver as described with reference to FIGS. 9 through 12.

At 1510 the base station 105 may determine a connection configuration for the mmW UE based at least in part on the handover configuration, the connection configuration including an allocation of resources to be used by the mmW UE for handover to the second base station. The operations of 1510 may be performed according to the methods described herein. In certain examples, aspects of the operations of 1510 may be performed by a configuration component as described with reference to FIGS. 9 through 12.

At 1515 the base station 105 may perform handover of the mmW UE from the first base station to the second base station based at least in part on the connection configuration. The operations of 1515 may be performed according to the methods described herein. In certain examples, aspects of the operations of 1515 may be performed by a handover component as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems 100, 200, or 300 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other PLD, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications, comprising:
receiving, at a second network device and from a first network device, a handover configuration for a millimeter wave (mmW) user equipment (UE), the handover configuration identifying a beam associated with the second network device and a handover time by which the mmW UE intends to attempt to communicate with the second network device via the beam;
determining a connection configuration for the mmW UE based at least in part on the handover configuration, the connection configuration including an allocation of resources to be used by the mmW UE for handover to the second network device; and
performing handover of the mmW UE from the first network device to the second network device based at least in part on the connection configuration.

2. The method of claim 1, wherein determining the connection configuration comprises:
determining a beam index for establishing a connection with the mmW UE.

3. The method of claim 1, further comprising:
transmitting, to the mmW UE, a reference signal, wherein handover is performed based at least in part on the reference signal.

4. The method of claim 3, further comprising:
receiving, from the mmW UE, a measurement report of the reference signal; and determining a beam configuration for the mmW UE based at least in part on the measurement report.

5. The method of claim 4, further comprising:
identifying a measurement configuration that comprises a measurement window; and
transmitting the measurement configuration to the mmW UE or the first network device, wherein the measurement report is based at least in part on the measurement configuration.

6. The method of claim 1, wherein the handover is performed without using a random access procedure.

7. The method of claim 1, wherein the mmW UE is associated with a high speed train.

8. The method of claim 1, wherein the mmW UE is a relay UE for a set of UEs.

9. A method for wireless communications, comprising:
transmitting, to a second network device and from a first network device, a handover configuration for a millimeter wave (mmW) user equipment (UE), the handover configuration identifying a beam associated with the second network device and a handover time by which the mmW UE intends to attempt to communicate with the second network device via the beam; and
performing handover of the mmW UE from the first network device to the second network device based at least in part on a connection configuration, the connection configuration including an allocation of resources to be used by the mmW UE for handover to the second network device.

10. The method of claim 9, further comprising:
receiving a measurement report, wherein the handover is performed based at least in part on the measurement report.

11. The method of claim 10, wherein receiving the measurement report is based at least in part on a measurement configuration that comprises a measurement window.

12. The method of claim 9, wherein the handover is performed without using a random access procedure.

13. The method of claim 9, wherein the mmW UE is associated with a high speed train.

14. The method of claim 9, wherein the mmW UE is a relay UE for a set of UEs.

15. An apparatus for wireless communication, comprising:
a processor;
memory coupled with the processor; and
instructions stored in the memory and executable by the processor to cause the apparatus to:
receive, from a first network device, a handover configuration for a millimeter wave (mmW) user equipment (UE), the handover configuration identifying a beam associated with the apparatus and a handover time by which the mmW UE intends to attempt to communicate with the apparatus via the beam;
determine a connection configuration for the mmW UE based at least in part on the handover configuration, the connection configuration including an allocation of resources to be used by the mmW UE for handover to the apparatus; and
perform handover of the mmW UE from the first network device to the apparatus based at least in part on the connection configuration.

16. The apparatus of claim 15, wherein the instructions are further executable by the processor to cause the apparatus to:
determine a beam index for establishing a connection with the mmW UE.

17. The apparatus of claim 15, wherein the instructions are further executable by the processor to cause the apparatus to:
transmit, to the mmW UE, a reference signal, wherein handover is performed based at least in part on the reference signal.

18. The apparatus of claim 17, wherein the instructions are further executable by the processor to cause the apparatus to:
receive, from the mmW UE, a measurement report of the reference signal; and
determine a beam configuration for the mmW UE based at least in part on the measurement report.

19. The apparatus of claim 18, wherein the instructions are further executable by the processor to cause the apparatus to:
identify a measurement configuration that comprises a measurement window; and
transmit the measurement configuration to the mmW UE or the first network device, wherein the measurement report is based at least in part on the measurement configuration.

20. The apparatus of claim 15, wherein the handover is performed without using a random access procedure.

21. The apparatus of claim 15, wherein the mmW UE is associated with a high speed train.

22. The apparatus of claim 15, wherein the mmW UE is a relay UE for a set of UEs.

23. An apparatus for wireless communication, comprising:
a processor;
memory coupled with the processor; and
instructions stored in the memory and executable by the processor to cause the apparatus to:
transmit, to a second network device, a handover configuration for a millimeter wave (mmW) user equipment (UE), the handover configuration identifying a beam associated with the second network device and a handover time by which the mmW UE intends to attempt to communicate with the second network device via the beam; and
perform handover of the mmW UE from the apparatus to the second network device based at least in part on a connection configuration, the connection configuration including an allocation of resources to be used by the mmW UE for handover to the second network device.

24. The apparatus of claim 23, wherein the instructions are further executable by the processor to cause the apparatus to:
receive a measurement report, wherein the handover is performed based at least in part on the measurement report.

25. The apparatus of claim 24, wherein the instructions to receive the measurement report are further executable by the processor based at least in part on a measurement configuration that comprises a measurement window.

26. The apparatus of claim 23, wherein the handover is performed without using a random access procedure.

27. The apparatus of claim 23, wherein the mmW UE is associated with a high speed train.

28. The apparatus of claim 23, wherein the mmW UE is a relay UE for a set of UEs.

* * * * *